(12) United States Patent
Li et al.

(10) Patent No.: US 12,267,934 B2
(45) Date of Patent: Apr. 1, 2025

(54) DRIVER ELECTRONICS FOR LIGHT EMITTING DIODE LIGHT ENGINE WITH INTEGRATED NEAR FIELD COMMUNICATION BASED CONTROLS INCLUDING HUMAN CENTRIC LIGHTING SETTINGS

(71) Applicant: LEDVANCE LLC, Wilmington, MA (US)

(72) Inventors: Ming Li, Acton, MA (US); Tianzheng Jiang, Shenzhen (CN); Anil Jeswani, Acton, MA (US)

(73) Assignee: LEDVANCE LLC, Wilmington, MA (US)

(*) Notice: Subject to any disclaimer, the term of this patent is extended or adjusted under 35 U.S.C. 154(b) by 141 days.

(21) Appl. No.: 17/875,003

(22) Filed: Jul. 27, 2022

(65) Prior Publication Data

US 2023/0031367 A1    Feb. 2, 2023

Related U.S. Application Data

(60) Provisional application No. 63/203,583, filed on Jul. 27, 2021.

(51) Int. Cl.
   *H05B 47/19*    (2020.01)
   *H05B 45/20*    (2020.01)

(52) U.S. Cl.
   CPC ............. *H05B 47/19* (2020.01); *H05B 45/20* (2020.01)

(58) Field of Classification Search
   CPC ...... H05B 45/20; H05B 47/19; H05B 47/175; H05B 47/11; H05B 45/10; H05B 47/155; H05B 47/10; H05B 47/115; H05B 47/185; H05B 45/00; H05B 45/40
   See application file for complete search history.

(56) References Cited

U.S. PATENT DOCUMENTS

| | | | |
|---|---|---|---|
| 11,425,803 B2* | 8/2022 | Ganick | H05B 45/10 |
| 11,737,183 B2* | 8/2023 | Casey | H05B 47/155 |
| | | | 315/297 |
| 2014/0049983 A1* | 2/2014 | Nichol | G02B 6/0018 |
| | | | 362/610 |
| 2016/0183344 A1* | 6/2016 | Chitta | H05B 45/20 |
| | | | 700/86 |
| 2018/0160491 A1* | 6/2018 | Biery | H05B 47/19 |
| 2021/0058758 A1* | 2/2021 | Carter | H04W 4/80 |
| 2022/0110195 A1* | 4/2022 | Casey | H05B 45/20 |
| 2023/0397309 A1* | 12/2023 | Casey | H05B 47/155 |

* cited by examiner

*Primary Examiner* — Monica C King
(74) *Attorney, Agent, or Firm* — Harry Hild

(57) ABSTRACT

A system for configuring a light structure that includes a light engine including at least one lighting scheme comprised of light emitting diodes (LEDs); and driver electronics for powering the light engine. The driver electronics also including at least a mixing integrated circuit (IC) for controlling current to the at one lighting schemes, and a near field communication (NFC) circuit having a near field communication (NFC) receiver and memory for storing instructions for sending signals from the NFC circuit to the mixing integrated circuit. The NFC receiver receives an external command signal that the instructions stored in the memory of the NFC circuit employ to provide for an NFC control signal to the mixing integrated circuit (IC) to adjust lighting characteristics of the light engine.

17 Claims, 13 Drawing Sheets

NFC Module

DC-DC For Module

DRIVER ELECTRONICS FOR LIGHT EMITTING DIODE LIGHT ENGINE WITH INTEGRATED NEAR FIELD COMMUNICATION BASED CONTROLS INCLUDING HUMAN CENTRIC LIGHTING SETTINGS

CROSS REFERENCE TO RELATED APPLICATION

The present application claims the benefit of U.S. provisional patent application U.S. 63/203,583 filed Jul. 27, 2021, the whole contents and disclosure of which is incorporated by reference as is fully set forth herein.

TECHNICAL FIELD

The present disclosure generally relates to methods and structures that incorporate light emitting devices (LEDs). More particularly, the present disclosure is directed to methods and structures for driver electronics for powering light engines including LEDs that can be controlled using near field communication (NFC) commands.

BACKGROUND

Improvements in lighting technology often rely on finite light sources (e.g., light-emitting diode (LED) devices) to generate light. In many applications, LED devices offer superior performance to conventional light sources (e.g., incandescent and halogen lamps). Further, light bulbs have become smarter in recent years. Many people are now replacing their standard incandescent bulb or classic LED bulb with smart bulb, which can be controlled wirelessly using smartphones or tablets. However, smart bulbs can be particularly expensive, and unnecessarily complex for some applications.

SUMMARY

The present disclosure provides methods and structures for adjusting performance characteristics and device settings for lighting devices including light emitting diode (LED) light engines using near field communication (NFC) communication protocols to communicate with the driver electronics for powering the LED light engines. Some embodiments of the present disclosure include using the NFC communication protocols to transmit lighting settings to the light engine of the lighting devices to emit lighting having lighting characteristics that provide human centric lighting (HCL). The NFC communication protocols allow for those lighting settings to be transmitted to a driver from an application (software) of a mobile computing device, such as a smart phone, by simply bringing the device into close contact with the driver. For example, the mobile computing device running the application for setting the lighting characteristics may transmit those configured lighting characteristics to the driver by near field communication (NFC) by tapping, e.g., making a momentary physical contact, the mobile computing device to the driver. In some examples, when the driver has received the lighting characteristic settings from the mobile device, a confirmation signal may be sent back to the mobile computing device by NFC signal, and in response to the confirmation signal a haptic feedback event may be performed by the mobile device. For example, the mobile device may vibrate or shake. This indicates to the user that the driver has been programmed by the NFC signal for lighting characteristics. This provides the user does not have to view the screen of the device or perform any confirmation operations. Further, by the haptic feedback, the user does not have to even view the screen of the mobile device that is running the application for setting lighting characteristics to determine that the driver has been successfully programmed. In this manner, the methods and structure provided herein allow for a quick mechanism for a user to program multiple drivers quickly. Additionally, in some embodiments, using the NFC protocol, the user can read existing light settings off of a driver that is in service. This can be helpful, when a user is servicing drivers or replacing drivers. For example, using the read function, the installer can record the lighting characteristics by near field communication (NFC) by tapping, e.g., making a momentary physical contact, the mobile computing device to the driver. In some examples, when the mobile computing device has received the lighting characteristic settings from the driver, a haptic feedback event may be performed by the mobile device. For example, the mobile device may vibrate or shake. This indicates to the user that the mobile computing device has recorded the lighting characteristic settings from the driver using NFC signal. Now that the mobile device has recorded the lighting characteristics from the driver in service, replacement drivers or additional drivers (and lighting products) having the same lighting characteristic settings can be programmed using NFC protocols. This allows for an installer, to retrieve lighting characteristics from in service drivers, and then program replacement drivers using NFC protocols and haptic feedback, which provides a quick mechanism for a user to program multiple drivers quickly to replace or add additionally drivers and lighting products to an existing installation so that all of the installed lighting products emit light having the same lighting characteristics.

In one embodiment, a system is provided for configuring a light structure that includes a light engine including at least one lighting scheme comprised of light emitting diodes (LEDs); and driver electronics for powering the light engine. The driver electronics includes at least a mixing integrated circuit (IC) for controlling current to the at one lighting schemes, and a near field communication (NFC) circuit having a near field communication (NFC) receiver and memory for storing instructions for sending signals from the NFC circuit to the mixing integrated circuit. The NFC receiver for receiving an external command signal that the instructions stored in the memory of the NFC circuit employ to provide for an NFC control signal to the mixing integrated circuit (IC) to adjust lighting characteristics of the light engine.

In another embodiment, a method for setting lighting characteristics of a lighting device is described that includes configuring the driver electronics to include a near field communication (NFC) receiver, wherein the driver electronics control current to the light engine of the lighting device. The method may further include running a control application on a mobile computing device including a near field communication (NFC) transmitter, in which the control application is for selecting light settings to be emitted by the light engine of the lighting device. The method further includes selecting the light settings to be emitted by the light engine of the lighting device from the control application; and transmitting the light settings selected using the control application from the mobile computing device using the NFC transmitter to the NFC receiver of the driver electronics. In some embodiments, the method further includes emitting light having the light settings from the light engine.

In yet another embodiment, a method for reading lighting characteristics of a lighting device is provided. The method may include configuring the driver electronics to include a near field communication (NFC) transmitter. The driver electronics include light characteristic settings that dictate the characteristics of light being emitted by a light engine in electrical communication with the driver electronics. In some embodiments, the method includes running a control application on a mobile computing device including a near field communication (NFC) receiver. The control application is for recording light settings from the driver electronics. The method further includes transmitting the light settings from the driver electronics to the mobile computing device using the NFC receiver of the mobile computing device to receive the light characteristic settings from the NFC transmitter of the driver electronics.

BRIEF DESCRIPTION OF THE DRAWINGS

The following description will provide details of embodiments with reference to the following figures wherein.

DETAILED DESCRIPTION

Figure 1:
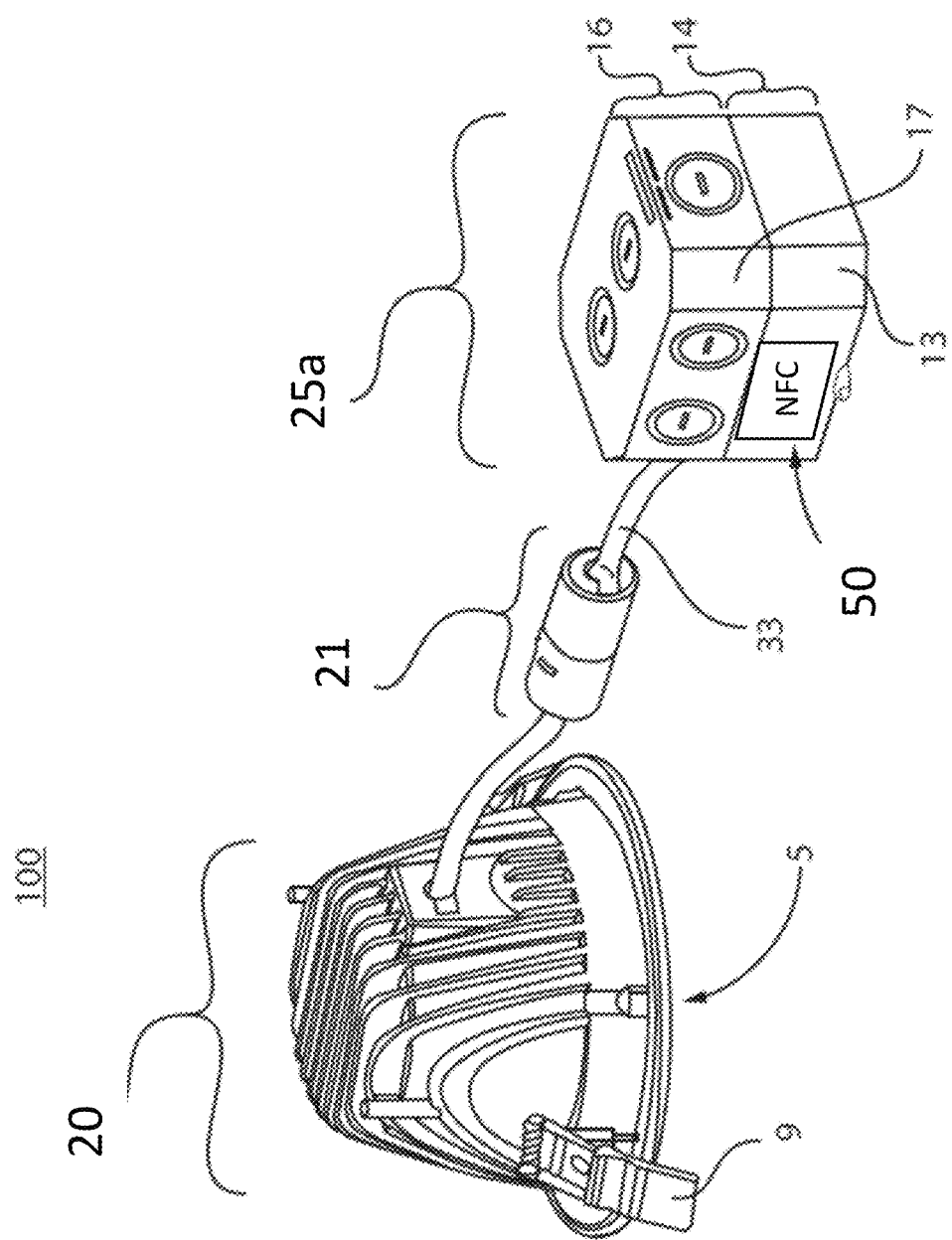
FIG. 1 is a perspective view of a downlight geometry luminaire including driver electronics with an integrated near field communication (NFC) transceiver for receiving commands for selecting lighting characteristics to be emitted by the luminaire, in which the housing for the driver electronics is vertically orientated and includes a compartment for the driver electronics and a junction box, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The driver electronics for luminaires, e.g., downlight geometry luminaires, including light engines with light emitting diodes (LEDs) can provide users with options for controlling lighting parameters, such as changing light output of lamps, adjusting the color correlated temperature (CCT) of lamps, adjusting the brightness of lamps, and changing the color of light emitting by lamps.

It is noted that although the present disclosure describes the driver designs with NFC controls being employed to control the lighting characteristics of a recessed can downlight, the present disclosure is not limited to only this example. The lighting form factor may be any type of lighting device that employs a driver having sufficient circuitry for controlling lighting characteristics of the light engine of the lighting device, which may be a light engine including light emitting diodes (LEDs). For example, the lighting form factor may be tube lighting, such as T5, T8 or T12 tube lighting. The lighting form factor may also be flood lights. The lighting form factor can also be strip lights. As noted any type of lighting device employing programmable driver electronics may be suitable for use with the NFC concepts of the present disclosure.

To provide controls for such types of adjustments, two options are typically available. One option is to employ a dimmer or switch to adjust flux output and change the color correlated temperature, color or step dim. Another option is to replace the lamp with a smart product, such as a product including controls through bluetooth, wifi, Zibee etc. It has been determined that using these types of controls, the devices can only provide step output parameters. More specifically, only a few settings for lighting characteristics can be selected by the user, and the settings may have large steps, e.g., incremental changes, from selecting one light characteristic to a next light characteristic. In some instances, the user can be an installer. To keep stock of product for installation, the user has to consider the limited number of lighting characteristics that can be selected for emission by the particular product. Similarly, suppliers have to consider their stock for the limited number of lighting characteristics that can be emitted. Additionally, to increase the number of selectable light settings for a product increases the costs associated with that product. In view of the limited number of settings for lighting characteristics that can be selected by the user, in some instances, it can be difficult for the user to select the optimum lighting characteristics for emission by the product.

In some embodiments, the methods, systems and computer program products that are described herein can control lighting parameters for the light emitted by luminaires using near field communication (NFC) commands, such as color and intensity/dimming, for light being projected by a lamp, such as a lamp bulb. Lighting parameters can be configured for human centric lighting (HCL). "Near Field Communication" (NFC) is a short-range wireless technology that enables simple and secure communication between electronic devices. It may be used on its own or in combination with other wireless technologies, such as Bluetooth. The communication range of NFC is roughly 10 centimeters. However, an antenna may be used to extended the range up to 20 centimeters.

In some embodiments, by using NFC commands, the methods, systems and computer program products that are described herein can quickly configure multiple drivers for installation. An installer can take a mobile computing device, e.g., a smart phone, having an application (also referred to as controller) installed thereon that allows for setting lighting characteristics of the drivers, and using NFC communication can transmit the lighting characteristics set by the application to the driver by bringing the mobile computing device in close proximity to the driver, e.g., by tapping, i.e., physical contact, between the mobile computing device and the driver. The installer can set lighting characteristics on the controller (application) run on the mobile device, and then program multiple drivers by transmitting the lighting characteristic settings to the drivers by NFC communication by contacting the mobile computing device and the driver together in direct physical contact, e.g., tapping them together. This provides a quick and easy way to program drivers, which can be repeated for multiple drivers following selection of the lighting characteristics. Although direct contact, e.g., tapping, is one embodiment of the present disclosure, programming only requires that the two elements, i.e., mobile computing device and driver, be brought in close enough contact for transmission by NFC protocol to occur, e.g., the NFC protocol may allow for transmission of data, such as lighting characteristics settings, over distances of 4 cm or less.

The methods, systems and computer program products may be employed using a mobile computing device, such as a cellular phone, e.g., smart phone, or tablet device, which include a device screen that can be used as the user interface for selecting lighting characteristics. The mobile computing device may have an NFC antennae for communicating with the NFC antennae of the driver electronics, e.g., driver box, for the luminaire for receiving the control signals that are used as commands for the user to select light settings for the light characteristics of the light being emitted by the light engine. It is noted that the mobile computing device that provides the user interface does not need to be a smart phone, as any type of near field communication (NFC) read-write equipment is suitable for providing the user interface.

The driver structures and methods that are provided herein are now describe with more detail with reference to FIGS. 1-14.

Figure 2:
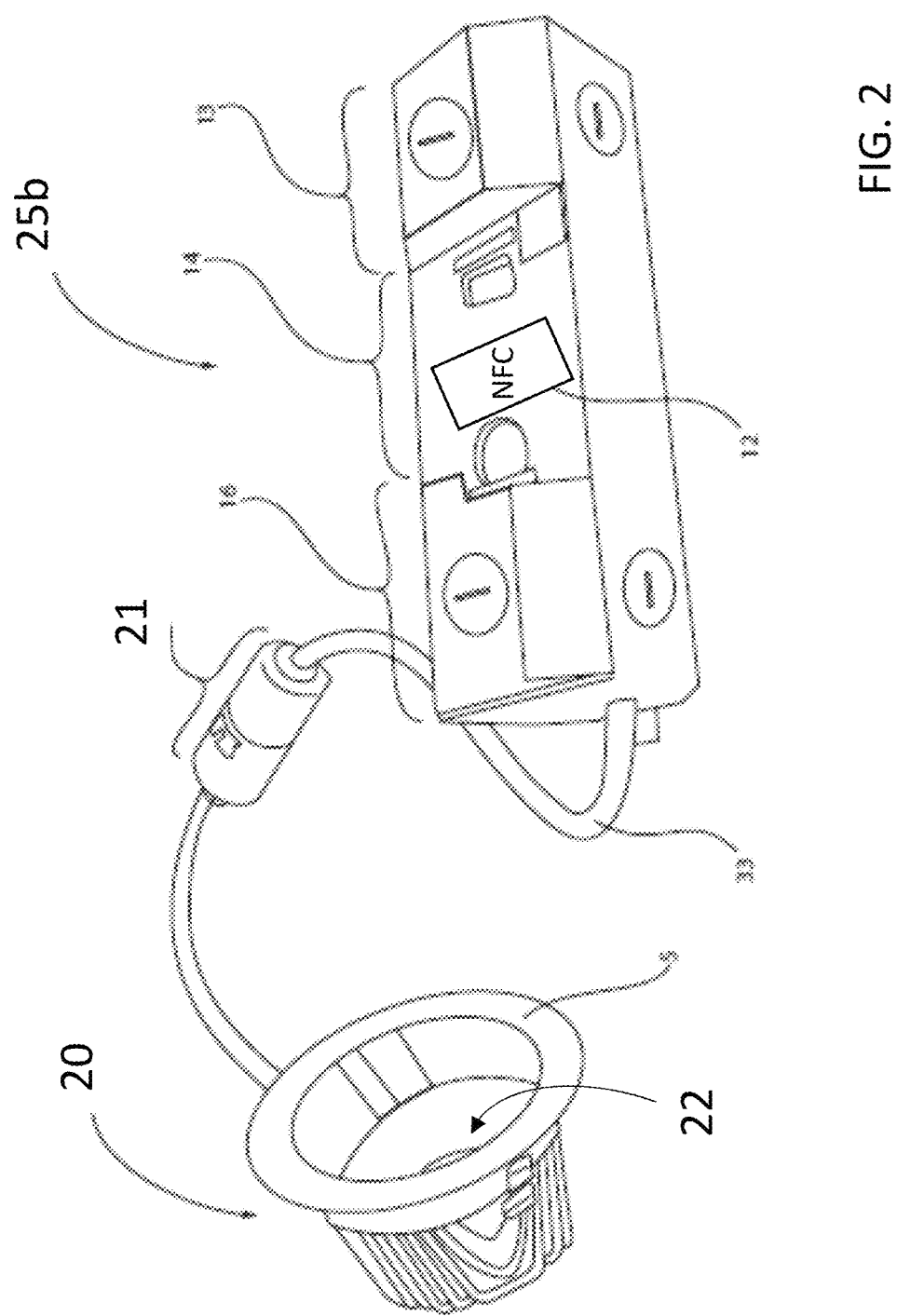
FIG. 2 is a perspective side view of a downlight geometry luminaire including driver electronics with an integrated near field communication (NFC) transceiver for receiving commands for selecting lighting characteristics to be emitted by the luminaire, in which the housing for the driver electronics is laterally orientated and includes a compartment for the driver electronics and a junction box, in accordance with one embodiment of the present disclosure.

FIGS. 1-3 illustrate one embodiment of a luminaire 100 that includes a light engine housing 20 including at least one lighting scheme of light emitting diodes (LEDs), and a driver electronics box 25a, 25b for powering the light engine 22. In some embodiments, the at least one lighting scheme is two lighting schemes in which a separate current can be set and adjusted to be sent to each of the two lighting schemes. It is noted that this is only one embodiment of the present disclosure. The light engine 22 may include any type of light emitting diode (LED), arranged in any array and any number of strings of light emitting diodes (LEDs).

FIG. 1 depicts a downlight geometry luminaire including driver electronics with an integrated near field communication (NFC) transceiver for receiving commands for selecting lighting characteristics to be emitted by the lamp, in which the housing 25a for the driver electronics is vertically orientated and includes a compartment for the driver electronics. FIG. 2 is a perspective side view of a downlight geometry luminaire including driver electronics with an integrated near field communication (NFC) transceiver for receiving commands for selecting lighting characteristics to be emitted by the luminaire, in which the housing 25b for the driver electronics is laterally orientated and includes a compartment for the driver electronics and a junction box.

As noted FIGS. 1 and 2 illustrate only one example of a lighting device that can have lighting characteristics controlled through a programmable driver. The lighting device of FIGS. 1 and 2 is a downlight. A "downlight", or recessed light, (also pot light in Canadian English, sometimes can light in American English) is a light fixture that is installed into a hollow opening in a ceiling. When installed it appears to have light shining from a hole in the ceiling, concentrating the light in a downward direction as a broad floodlight or narrow spotlight. "Pot light" or "canister light" implies the hole is circular and the lighting fixture is cylindrical, like a pot or canister.

In other embodiment, the lighting device may have a tube lamp form factor. There are a number of different types and standards for tube lights. Some examples of standards for tube lighting include UL Type A T8 lamp, UL Type B T8 lamp, and T12 magnetic and electronic ballast lamps. These types of tube lighting employ a G13 socket. The G13 pin type is a double pin design, in which the center to center distance between the two pins is 0.50 inches (12.7 mm), and the din diameter is 0.093 inches (2.35 mm). In addition to T8 and T12 tube types, the G13 socket design is also suitable for T10 type tube lamps. These are just examples, and are not intended to be limiting.

Additionally, the lighting device may be a flood lamp or a flexible LED strip lights. Any type of lighting device using driver electronics with adjustable electronic performance is suitable for use with the methods and structures of the present disclosure.

Broadly, the lamp of the present disclosure is a lighting fixture that includes a housing 20 for containing the light engine, e.g., light emitting diode (LED) light engine, and driver electronics 25a, 25b. The driver electronics convert higher voltage, alternating current to low voltage, direct current, which is used to energize the LEDs of the light engine. The driver electronics also keep the voltage and current flowing through an LED circuit at its rated level. The driver electronics 25a, 25b include a near field communication (NFC) circuit 50; and a connection between the first housing containing the light emitting diode (LED) light source and the second housing including the driver electronics.

The light fixtures of the present disclosure further include an electrical connection between the driver electronics 25a, 25b and the light engine within the housing 20 of the lighting fixture 100. In the embodiment that is depicted in FIGS. 1 and 2, the electrical connection between the driver electronics 25a, 25b and the light engine within the housing 20 may be a reversible driver to light source connector 21 for electrically connecting the first housing containing the light emitting diode (LED) light source and the second housing including the driver electronics. The two housings, e.g., a first housing including the light emitting diode (LED) light source, and a second housing including the driver electronics, connected by the reversible driver to light source connector 21 allows for the two housings to be separated to allow for installation in both new construction or retrofit applications.

The light engine housing 20 may be composed of a metal, such as aluminum (Al), which provides for heat dissipation of any heat produced by the light engine. In some embodiments, to provide for increased heat dissipation, a plurality of ridges or fin structures may be integrated into the aluminum housing, e.g., first housing. In some embodiments, the light engine housing 20 may also be composed of a plastic, such a polycarbonate.

Figure 3A:
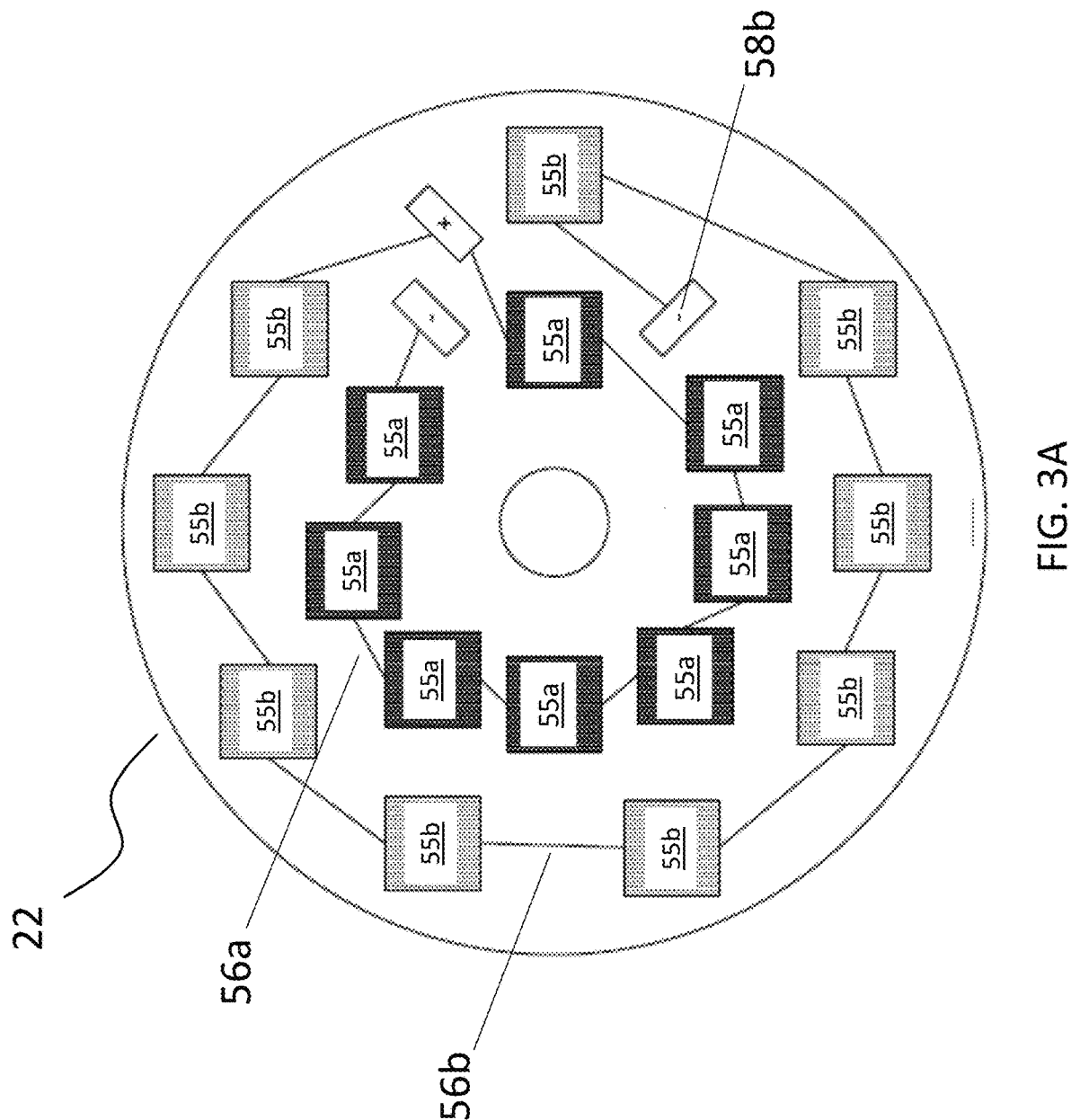
FIG. 3A is a top down view of a light engine including a plurality of solid state light emitters providing the light source of a lamp that includes two strings of light emitting didoes (LEDs) to provide at least one lighting scheme (e.g., two lighting schemes), in accordance with one embodiment of the present disclosure.
Figure 3B:
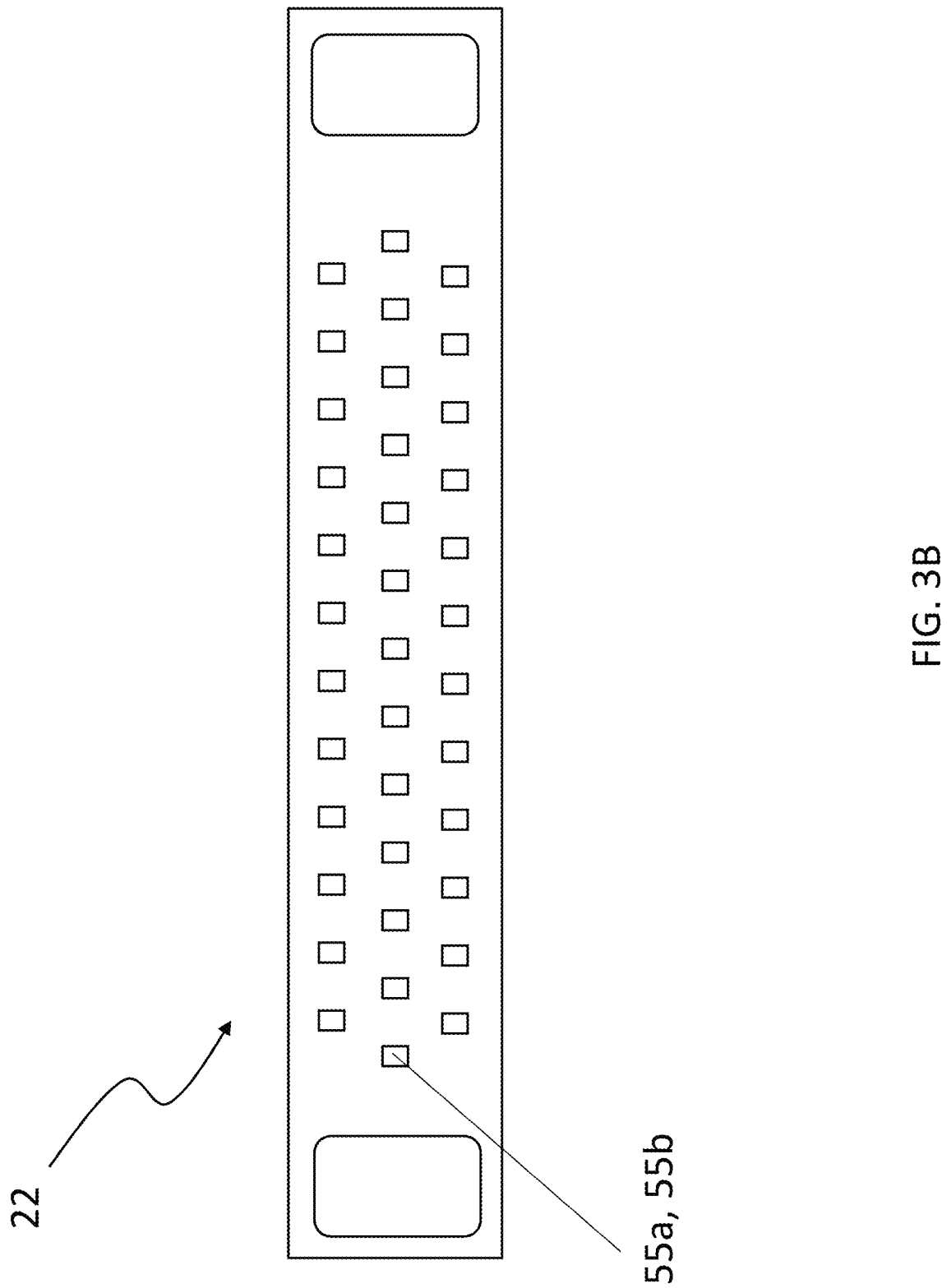
FIG. 3B is a top down view of a light engine including a plurality of solid state light emitters providing the light source of a tube lamp type lighting device, in accordance with one embodiment of the present disclosure.

FIG. 3A illustrates a light engine 22 that can be housed within the light engine housing 20 that is depicted in FIGS. 1 and 2. However, as noted, the form factor depicted in FIGS. 1 and 2 is a recessed can downlight, and the present disclosure is not limited to only this type of lighting device. For example, the lighting device may have other form factors, such as a tube lamp. FIG. 3B illustrates one example of a light engine 22 for a tube lamp, in which the light emitting diodes (LEDs) for the light engine 22 are illustrated by reference numbers 55a, 55b. Although the following description is for lighting devices of the recessed can downlight variety, it is noted that the present disclosure is not limited to only that example.

The light engine 22 as depicted in FIGS. 3A and 3B produces light from solid state emitters. The term "solid state" refers to light emitted by solid-state electroluminescence, as opposed to incandescent bulbs (which use thermal radiation) or fluorescent tubes, which use a low pressure Hg discharge. Compared to incandescent lighting, solid state lighting creates visible light with reduced heat generation and less energy dissipation. Some examples of solid state light emitters that are suitable for the methods and structures described herein include inorganic semiconductor light-emitting diodes (LEDs), organic light-emitting diodes (OLED), polymer light-emitting diodes (PLED) or combinations thereof. Although the following description describes an embodiment in which the solid-state light emitters are provided by light emitting diodes, any of the aforementioned solid-state light emitters may be substituted for the LEDs.

In some embodiments, the light source (also referred to as light engine 22) is provided by a plurality of LEDs 55a, 55b that can be mounted to the circuit board by solder, a snap-fit connection, or other engagement mechanisms. In some examples, the LEDs 55a, 55b are provided by a plurality of surface mount device (SMD) light emitting diodes (LED). The circuit board for the light engine may be composed of a metal core printed circuit board (MCPB). MCPCB uses a thermally conductive dielectric layer to bond circuit layer with base metal (Aluminum or Copper). In some embodiments, the MCPCB use either Al or Cu or a mixture of special alloys as the base material to conduct heat away efficiently from the LEDs thereby keeping them cool to maintain high efficacy.

It is noted that the number of LEDs 55a, 55b on the printed circuit board may vary. For example, the number of LEDs 55a, 55b may range from 5 LEDs to 70 LEDs. In another example, the number of LEDs may range from 35 LEDs to 45 LEDs. It is noted that the above examples are provided for illustrative purposes only and are not intended to limit the present disclosure, as any number of LEDs may be present the printed circuit board. In some other examples, the number of LEDs 55a, 55b may be equal to 5, 10, 15, 20, 25, 30, 35, 40, 45, 50, 55, 60, 65 and 70, as well as any range of LEDs with one of the aforementioned examples as a lower limit to the range, and one of the aforementioned examples as an upper limit to the range.

The LEDs 55a, 55b may be arranged as strings on the printed circuit board. When referring to a "string" of LEDs it is meant that each of the LEDs in the string 56a, 56b are illuminated at the same time in response to an energizing act, such as the application of electricity from the driving electronics, e.g., driver, in the lamp. In the embodiment depicted in FIG. 3A, the light engine 22 includes two strings 56a, 56b.

It is noted that the strings of LEDs 56a, 56b depicted in FIG. 3A is only one example of an LED configuration for a light engine 22. The present disclosure is not limited to only this example. For example, the light engine 22 may also employ light emitting diodes configured for use in a tube lamp, as depicted in FIG. 3B. Additionally, embodiments having been contemplated in which LED filaments may be substituted for the individual LEDs that are employed in FIGS. 3A and 3B. LED filaments are equally applicable for providing the LEDs of the light engine 22.

The lamp structure and methods of the present disclosure employ light engines having at least one light scheme, e.g., a plurality of light schemes, that are modulated to provide different light characteristics for the light being emitted by the light engine 22. A "light scheme"' is a grouping of lights, e.g., an LED string 56a, 56b, in which the lighting scheme provides that the LEDs 55a, 55b in the light scheme when illuminated provide a specific lighting characteristic, e.g., a specific value for one of color, color correlated temperature or intensity. By providing multiple lighting schemes each having different associated light characteristics, and controlling the amount of current being directed to each of the different lighting schemes, the collective light characteristics for the totality of light schemes emitting light for the light engine 22 may be adjusted.

In one embodiments, the light engine 22 may be composed of multiple strings, e.g., two strings 56a, 56b, of LEDs 55a, 55b, in which each string 56a, 56b of LEDs 55a, 55b can provide a separate lighting scheme. In another example, each LED filament in the light engine 22 can provide a different LED lighting scheme.

In one embodiment, each scheme of LEDs may be illuminated to provide an intensity of light emitted by the light engine 22 for the lamp 100 that can range from 300 lumens (LM) to 1500 lumens (LM). As noted, each scheme of LEDs 55a, 55b may be selected to provide a different value of lumens when the LED string 56a, 56b is illuminated. The mixing integrated circuit (IC) 35 can distribute current to each of the lighting scheme to mix the light being emitted by the lighting schemes. By mixing the light produced by the separate lighting scheme, the light characteristics of the light engine 22 may be a mixture of the light characteristics of the individual lighting schemes. The greater the current applied to a particular lighting scheme, the greater the contribution of the lighting characteristics for that lighting scheme to the lighting characteristics of the total light, e.g., total light spectra, being emitted by the light engine 20.

In some embodiments, each of the lighting schemes 56a, 56b of the LEDs 55a, 55b of the light engine 22 may illuminated in mixtures provided by current distributions through a mixing integrated circuit 35 of the driver electronics within the housing 25a, 25b, and includes a near field communication (NFC) circuit 50. In some embodiments, each of the lighting schemes 56a, 56b of the LEDs 55a, 55b of the light engine 22 may illuminated in mixtures provided by current distributions through a mixing integrated circuit 35 of the driver electronics to provide an intensity of total light provided by the totality of lighting schemes that is equal to 350 lumens (LM) 500 lumens (LM), 550 lumens (LM), 700 lumens (LM), 750 lumens (LM), 1200 lumens (LM), 5000 lumens (LM), as well as any range of intensity values included one of the aforementioned values for the lower end of the range, and one of the aforementioned values for the upper end of the range, as well as individual values for intensity within those ranges.

The intensity of the light emitted by the light engine 22 is a characteristic of light emitted by the lamp 100 that can be controlled by wireless controls using near field communication (NFC) signals.

In some embodiments, the LEDs 55a, 55b of the lamp 100 are selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation.

More specifically, in some embodiments, different lighting schemes, e.g., LED strings 56a, 56b, of LEDs 55a, 55b include different colors. For example, each lighting scheme includes an assigned color that is different from the other lighting schemes. For example, a first string of LEDs 56a may include LEDs 55a that emit blue light, and the second string of LEDs 56b may include LEDs 55b that emit red light.

Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

The mixing integrated circuit (IC) 35 of the driver electronics within the second housing, i.e., driver electronics box 25a, 25b containing the driver electronics (and the near field communication (NFC) circuit 50) can distribute current to each of the lighting scheme to mix the light, e.g., color of light, being emitted by the lighting schemes. By mixing the light produced by the separate lighting schemes, the color light characteristic of the light engine 20 may be a mixture of the color light characteristics of the individual lighting schemes. The greater the current applied to a particular lighting scheme with a specific color lighting characteristic, the greater the contribution of that color lighting characteristic for that lighting scheme to the color lighting characteristics of the total light, e.g., total color light spectra, being emitted by the light engine 22.

The LEDs of the lamp 100 may also be selected to allow for adjusting the "color correlated temperature (CCT)" of the light they emit. The color temperature of a light source is the temperature of an ideal black-body radiator that radiates light of a color comparable to that of the light source. Color correlated temperature is a characteristic of visible light that has applications in lighting, photography, videography, publishing, manufacturing, astrophysics, horticulture, and other fields. Color correlated temperature is meaningful for light sources that do in fact correspond somewhat closely to the radiation of some black body, i.e., those on a line from reddish/orange via yellow and more or less white to blueish white. Color correlated temperature is conventionally expressed in kelvins, using the symbol K, a unit of measure for absolute temperature. Color correlated temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs of the luminaires provided by the present disclosure in some embodiments can range from 2000K to 6500K.

In some embodiments, each lighting scheme of LEDs 55a, 55b may be selected to provide a different value of color correlated temperature (CCT) when the LED string 56a, 56b is illuminated. The mixing integrated circuit (IC) 35 can distribute current to each of the lighting schemes to mix the light being emitted by the lighting schemes. By mixing the light produced by the separate lighting schemes, the light characteristics of the light engine 22 may be a mixture of the light characteristics of the individual light schemes. For example, by mixing two light schemes of two different color correlated temperatures (CCT), the value for the color correlated temperature (CCT) for the total light being emitted by the light engine 22 may be a value between the two values specifically provided by the separate light schemes. The greater the current applied to a particular lighting scheme, the greater the contribution of the lighting characteristics for that particular lighting scheme is contributed to the lighting characteristics of the total light, e.g., total light spectra, being emitted by the light engine 22.

In some examples, each of the lighting schemes 56a, 56b of the LEDs 55a, 55b of the light engine 22 may illuminated in mixtures provided by current distributions through the mixing integrated circuit 35 to provide a color correlated temperature of total light provided by the totality of lighting schemes that is equal to 2500K, 3000K, 3500K, 4000K, 5000K or 6500K, as well as any range of color correlated temperature (CCT) values including one of the aforementioned values for the lower end of the range, and one of the aforementioned values for the upper end of the range, as well as individual values for color correlated temperatures (CCT) within those ranges.

The color correlated temperature (CCT) of the light emitted by the light engine 22 is a characteristic of light emitted by the light engine 22 that can be controlled by wireless controls using near field communication (NFC) signals.

Any lighting characteristic for the light being emitted by the light emitting diodes (LEDs) may be adjusted/controlled by wireless controls using near field communication (NFC) signals.

For example, the lighting characteristics for the light being emitted by the light emitting diodes may be adjusted/controlled by wireless controls using near field communication (NFC) signals to provide human centric lighting (HCL). With light characteristics for light emitted by the light emitting diodes to provide human centric lighting (HCL), indoor lighting no longer revolves around unchanging fixtures. Instead, it mimics the natural world's light cycle and supports the circadian rhythm of the occupants within the rooms that have been adjusted to provide human centric lighting (HCL). As a result, HCL encourages productivity during the day and relaxation at night, potentially leading to an improved overall quality of life of the occupants in the rooms that have had the lighting characteristics of the lighting fixtures adjusted to be consistent with human centric lighting (HCL). HCL is achieved via tunable light-emitting diode (LED) fixtures, which are easy to adjust to simulate sunlight. Tunable LED lights feature various correlated color temperatures (CCTs).

Circadian rhythms are the mental, behavioral and physical changes that follow a regular pattern. These changes mainly respond to the surrounding environment's lightness or darkness. Sleeping at night when it's dark and being awake during the day is an example of a circadian rhythm. Most living creatures, including plants, experience circadian rhythms, and this pattern repeats approximately every 24 hours. Natural light is the strongest cue needed to reset the 24-hour sleep-wake cycle.

Figure 4:
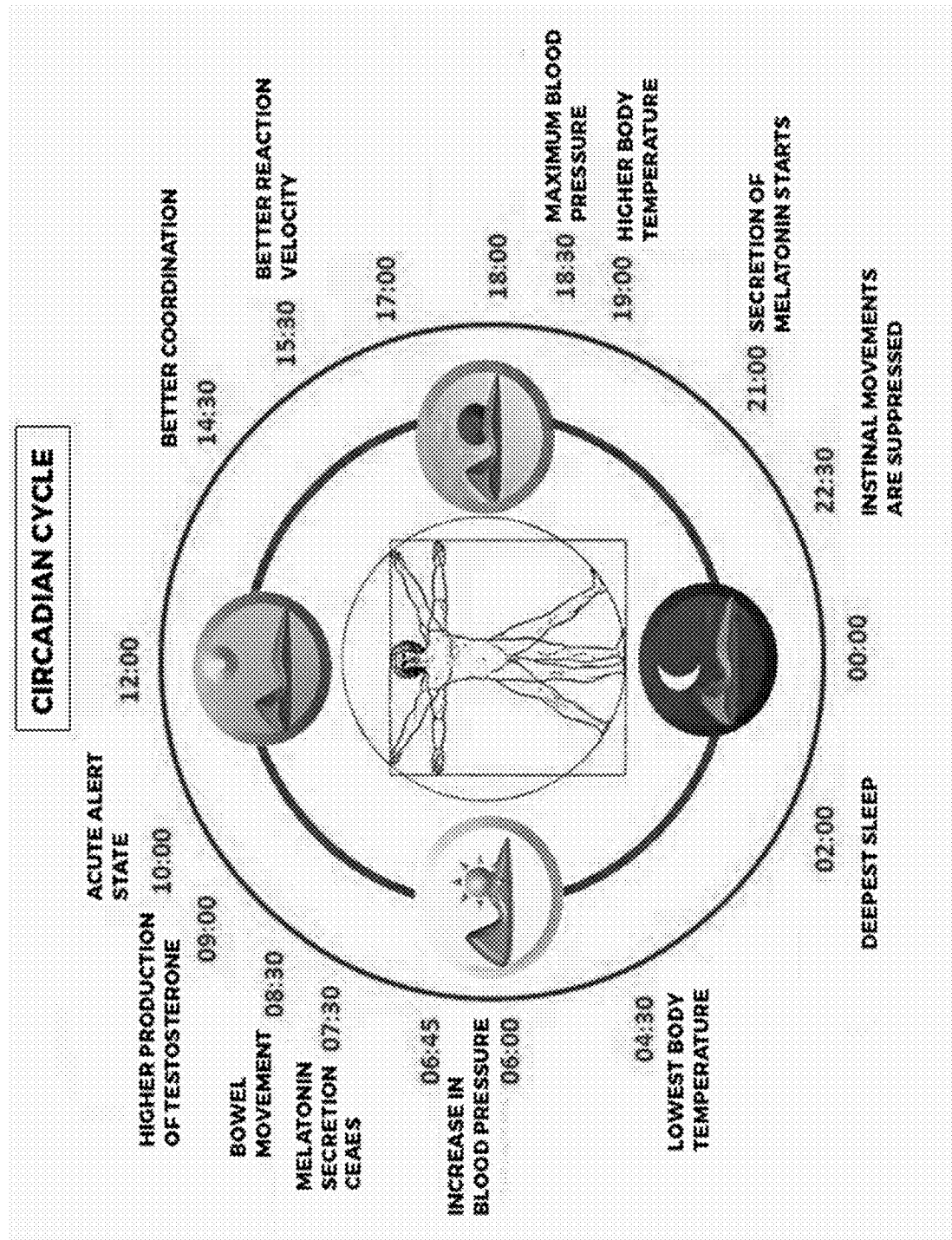
FIG. 4 is an illustration depicting human circadian rhythm, in which the depiction illustrates different human functions at time periods that are optimized for those functions, in accordance with human circadian rhythm.
Figure 5:
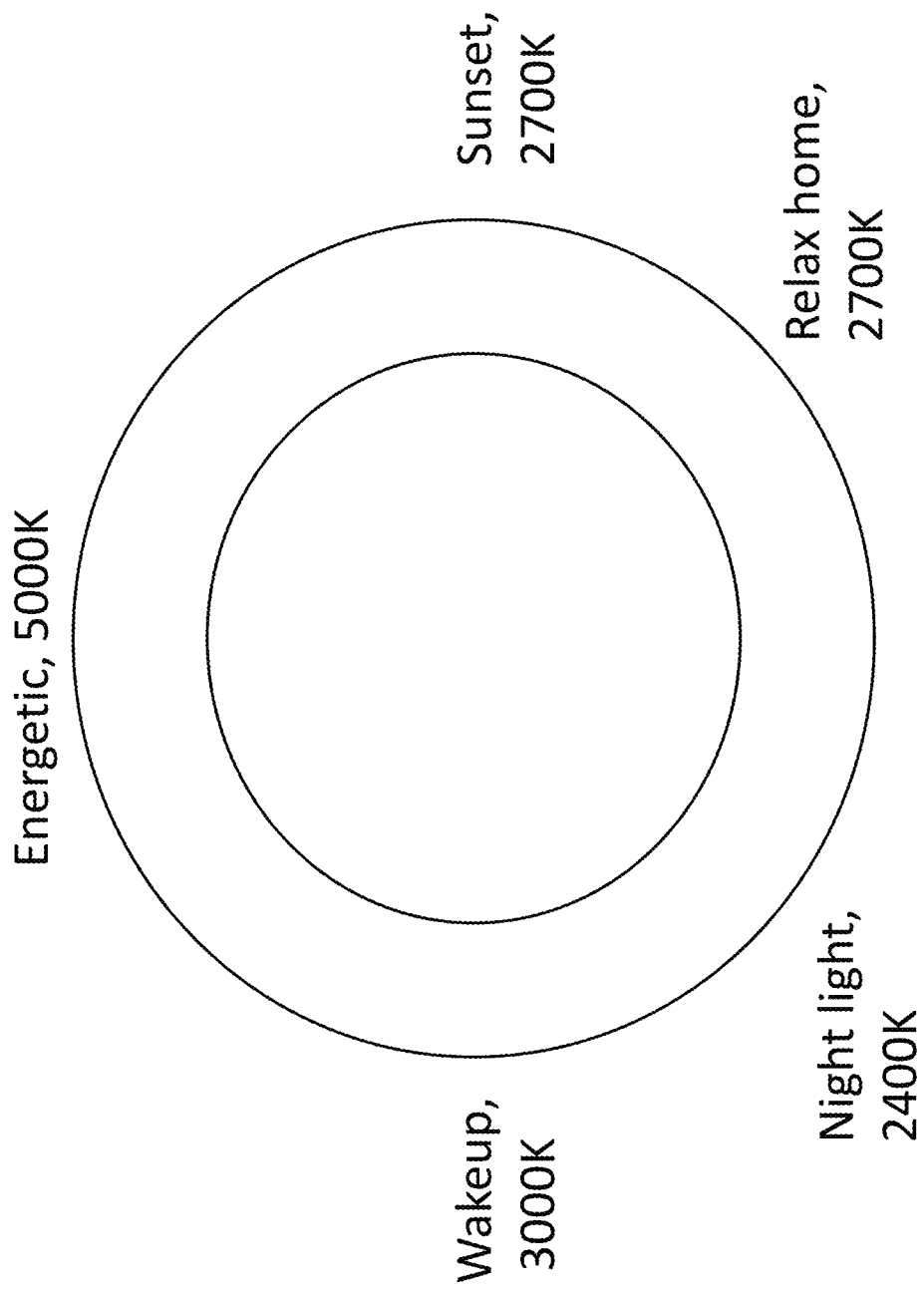
FIG. 5 is an illustration of a lighting setting that correlates color temperatures in lighting to the time periods of the human circadian rhythm depicted in FIG. 4, in accordance with one embodiment of the present disclosure.

FIGS. 4 and 5 illustrates an exemplary embodiment of a lighting characteristic setting for a bedroom light, in which the lighting characteristics take into account the human circadian rhythm. Circadian rhythms are physical, mental, and behavioral changes that follow a daily cycle. They respond primarily to light and darkness in an organism's environment. Sleeping at night and being awake during the day is an example of a light-related circadian rhythm.

FIG. 4 is an illustration depicting a circadian rhythm of a human, which illustrates the different human biological functions during the hours of the day. FIG. 5 is an illustration of an initial setting that correlates color temperatures in lighting to the time periods of the human circadian rhythm illustrated in FIG. 4. Comparison of FIGS. 4 and 5 illustrate one example of an initial set up for lighting controls in which the light color tone changes with time according to the human circadian rhythm. For example, at noon, i.e., 1200, of the circadian rhythm depiction in FIG. 4, the color temperature setting may be equal to 5000K for energetic human behavior, as depicted in FIG. 5. In another example, at approximately 18:00 of the human circadian rhythm, which may be the time of highest blood pressure and/or highest body temperature, the color temperature setting may be equal to 2700K for sunset, as depicted in FIG. 4. In another example, at approximately 21:00 of the human circadian rhythm, which may be the time at which melatonin secretion starts, the color temperature setting may be equal to 2700K for relaxation, as depicted in FIG. 4. In another example, at approximately 2:00 of the human circadian rhythm, which may be the time of deepest sleep, the color temperature setting may be equal to 2400K for a night light, as depicted in FIG. 4. In another example, at approximately 6:00 of the human circadian rhythm, the color temperature setting may be equal to 3000K for wakeup, as depicted in FIG. 4.

FIGS. 4 and 5 illustrate one example of a scheduled adjustment of color correlated temperature along a 24 hour period according to a human circadian rhythm. This is one example of how lighting characteristics can be programmed to provide human centric lighting (HCL). In some embodiments, the appropriate light settings for human centric lighting (HCL) may be programmed into the application (also referred to as controller) for setting lighting characteristics of the electronic drivers that is running on a mobile computing device. The human centric lighting (HCL) characteristics, which can include cycle of color correlated temperatures corresponding to time, as depicted in FIGS. 4 and 5, can then be transmitted from the mobile computing device to the driver electronics 25a, 25b for the lighting devices using near filed communication (NFC) protocols.

Referring to FIGS. 1 and 2, in some embodiments, the NFC circuit 50 in the driver housing 25a, 25b receives commands sent using near filed communication (NFC) standards for controlling the characteristics of light being emitted by the light engine 22. Referring to FIGS. 1-2 and 6-9, in some embodiments, the driver electronics 30 include at least a mixing integrated circuit (IC) 35 for controlling current to the at least two lighting schemes, e.g., strings of LEDs 56a, 56b. The instructions provide that NFC commands received by the NFC receiver 51 produce an output that is configured to signal the mixing integrated circuit 35 to set a separate current to each of the at least two lighting schemes to control light characteristics for light being emitted by the light engine 22. The mixing integrated circuit 35 is analog providing signal for a functionally continuous range of light characteristics.

Figure 6:
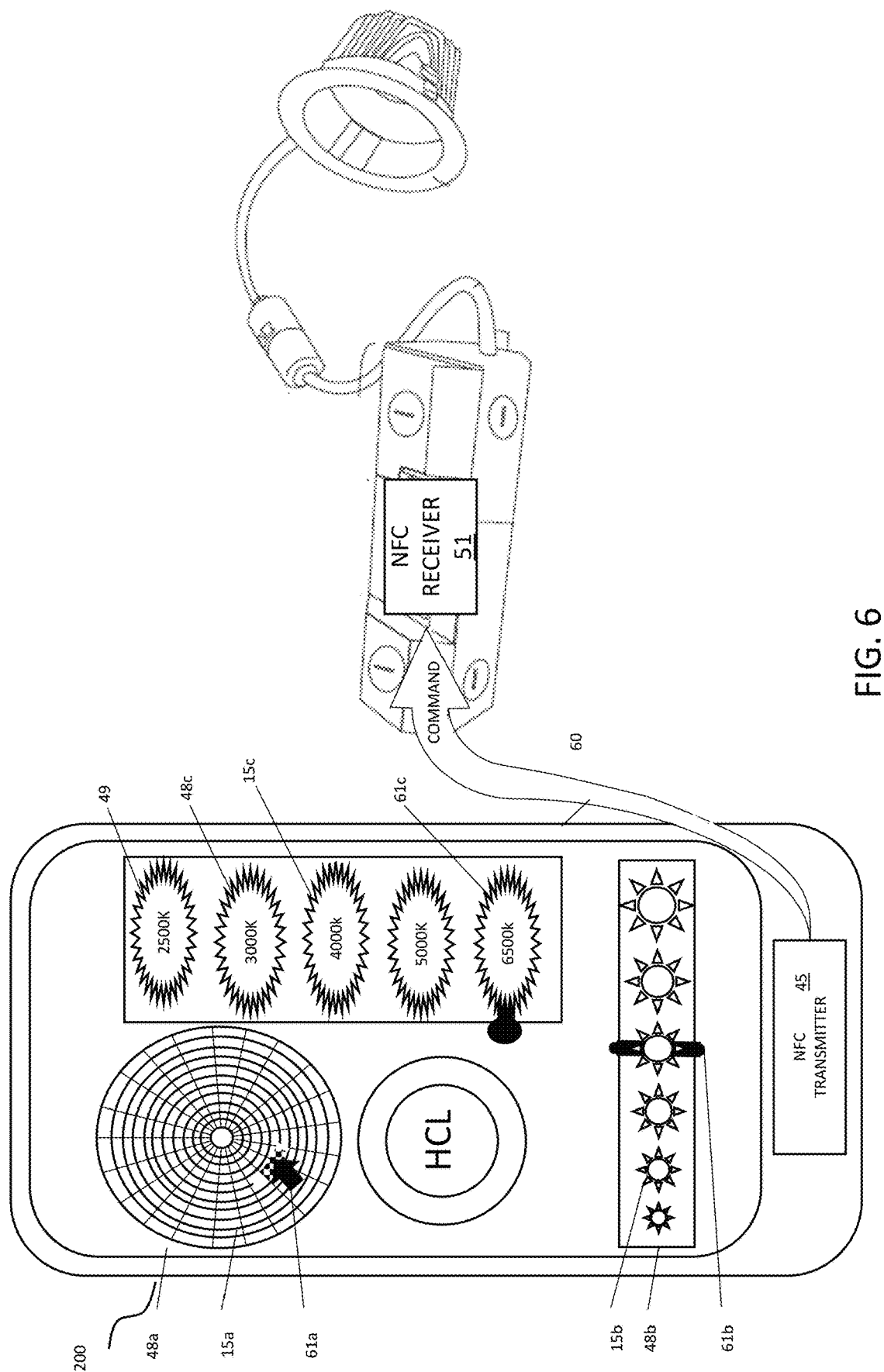
FIG. 6 is an illustration depicting a control device, e.g., mobile device, sending light characteristic control commands that selected from a user interface on the mobile devices to a lamp, in which the transmission between the lamp and the mobile device is by near field communication (NFC) transmission.

FIG. 6 is an illustration depicting a control device 200, e.g., mobile device. Light characteristic control commands that are selected from a user interface 49 on control device 200 are sent to the second housing 25a, 25b (driver electronics box 25a, 25b) of the downlight that includes an NFC receiver 51 (or transceiver) of a near field communication (NFC) circuit 50 that is integrated into the driver electronics 30. The transmission between the driver electronics 30 in the second housing 25a, 25b (driver electronics box) and the control device 200 is by near field communication (NFC) transmission, e.g., a near field communication (NFC) signal 60. NFC is a wireless signals. NFC works on the principle of sending information over radio waves. Near Field Communication (NFC) is a standard for wireless data transitions. This means that devices adhere to certain specifications in order to communicate with each other properly. The technology used in NFC is based on RF ID (Radio-frequency identification), which use electromagnetic induction in order to transmit information. NFC can be used to induce electric currents within passive components as well as just send data. This means that passive devices don't require their own power supply. They can instead be powered by the electromagnetic field produced by an active NFC component when it comes into range.

Electromagnetic fields can be used to transmit data or induce electrical currents in a receiving device. Passive NFC devices draw power from the fields produced by active devices, but the range is short. The transmission frequency for data across NFC is 13.56 megahertz. In some embodiments, can send data at either 106, 212, or 424 kilobits per second.

Although FIG. 6 depicts the control device 200 as a mobile device, such as a smart phone, the present disclosure is not limited to only this example. Any device having a user interface 49 for selecting lighting characteristics and an NFC transmitter 45 can be used to control the light emissions from the light engines 22 that are driven by the driver electronics 30 described herein. The NFC transmitter 45 (or transceiver) sends the NFC signal 60 to the driver electronics 30, which can be received by an NFC receiver 51 (or transceiver) of the near field communication (NFC) circuit 50.

For example, the control device 200 can be a machine including at least one hardware processor. One example of mobile computing device that is suitable for use with the light methods that are described herein includes a phone having a touchscreen interface and an operating system capable of running applications, which can be referred to as a smart phone. In addition to cellular access, the smart phones can also have internet access. Another example of a control device 200 that is suitable for use with the methods, systems and computer program products described herein can be a tablet computer. In some examples, the tablet computer may be a computer contained in a touchscreen panel housing. The tablet computer may have at least one of internet or cellular access. In some embodiments, the control device 200 may be a dedicated light controller having a touch screen.

In some embodiments, the mobile computing device 200 may include at least one form of memory that provides for storing a set of instructions to be executed by a hardware processor within the mobile computing device 200 to provide a user interface 49 through which a user can select lighting characteristics to be emitted by the light engine of the lighting device, and then transmit those lighting characteristics to the driver electronics of the lighting device by near field communication (NFC). Once received by the driver electronics, the selected lighting characteristics are saved at the driver electronics and then used to power the light emitting diodes of the light engine in providing illumination having the selected lighting characteristics.

The user interface 49 can include a light control interface that includes a grid of light characteristics, as depicted in FIG. 6. The grid of light functions 48a, 48b, 48c can include a plurality of selectable light characteristics 15a, 15b, 15c. In the embodiment that is depicted in FIG. 4, the grid of light characteristics includes a color wheel 48a for selecting color, a bar of intensity values 48b for selecting intensity, and a bar of color correlated temperature (CCT) values 48c for selecting the color correlated temperature (CCT).

It is noted that the grid depicted in FIG. 6 is only one example of a user interface for selecting lighting characteristics. The present disclosure is not limited to only this example. For example, the grid of light characteristics settings does not need to include all of the light characteristic types for selection that are depicted in FIG. 6. The control device can equally provide for selection of one or two of the light characteristic settings selected from color, intensity and color correlated temperature (CCT).

In the screen shot depicted in FIG. 6, the plurality of selectable light function settings 15a, 15b, 15c that are included on the grid of selectable light function settings 48a, 48b, 48c for the type of light to be projected by a luminaire can be selected by traversing a cursor 61a, 61b, 61c over the light function setting that the user desires to select. This can be done through use of a touch screen. However, any mechanism is suitable, such as a mouse controller.

A touch screen is a display screen that is also an input device. The screens are sensitive to pressure. One mechanism by which the user interacts with graphic user interface 49 of the control device 200 is through the touch screen by touching pictures, icons, words or any selectable image/feature that is displayed on the screen. The touchscreen may be provided by a resistive touchscreen, a surface acoustic wave touchscreen, a capacitive touchscreen or a combination thereof. Any screen that can display the graphic user interface 49 and receiving commands through touch gestures, e.g., finger touch or stylus touch, is suitable for use with the methods, systems and computer program products described herein. As noted above, the touch screen is only one input device used in the mobile computing device for controlling lighting.

The graphical user interface (GUI) 49 is a type of user interface that allows users to interact with electronic devices, such as the control device 200 and luminaires, through graphical icons and visual indicators, such as secondary notation, instead of text-based user interfaces, typed command labels or text navigation. The graphic user interface 49 includes a grid of light functions 48a, 48b, 48c, in which each grid of light functions 48a, 48b, 48c includes selectable light function settings 15a, 15b, 15c, as illustrated in FIG. 4. In one embodiment, the plurality of selectable light function settings 15a includes a plurality of colors. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, systems and computer program products described herein can include red, orange, yellow, green, blue, indigo, violet and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

In one embodiment, the grid of light functions 48a that provides the selectable light function settings 15a for colors is in the form of a color wheel, as depicted in FIG. 6. In the example of the color wheel may include colors, such as red (R=red), orange (O=orange), green (G=green), blue (B=blue), indigo (I=indigo), and violet (V=violet), in which the color families are arranged following a perimeter in the ROYGBIV sequence. The color wheel includes a plurality of selectable light function settings 15a for each family of the aforementioned colors. In some embodiments, the range of lightness to darkness for each family of colors may range from the lightest colors, i.e., having a greatest degree of white, starting from the center of the color wheel (at which white (W=white) is present), in an increasing degree of darkness, i.e., having a greater degree of black, to a darkest color at the perimeter of the color wheel.

In the example that is depicted in FIG. 6, there are 11 selectable light function settings 15a ranging from the lightest variation, i.e., closest to the center of the wheel, to the darkest variation of the color, i.e., present at the outermost perimeter of the wheel. It is noted that this is only one example of the degree of lightness/darkness, e.g., white/dark, present in a color, and is not intended to limit the present disclosure. In other embodiments, the amount of selectable light function settings 15a illustrating the range of lightness to darkness may be equal to 1, 5, 10, 15, 20, 30, 40, 50, 60, 70, 80, 90, 100 and 1000, and any range of light function settings, in which one of the aforementioned examples provides a lower limit to the range and one of the aforementioned examples provides an upper limit to the range, as well as any value within those ranges.

Still referring to FIG. 6, the color wheel may also provide for variations in the color family so that mixtures of colors, e.g., mixtures of red and orange, mixtures of orange and yellow, mixtures of yellow and green etc., are included within the selectable light function settings 15a of the color wheel. In the embodiment depicted in FIG. 6, each family of colors, i.e., red R, orange O, yellow Y, blue B, indigo I and violet V, may include members having a lesser amount of at least a second color that is mixed with the primary color, i.e., red R, orange O, yellow Y, blue B, indigo I and violet V, to provide different shades of the primary color. In the illustration of the color wheel depicted in FIG. 6, for each of the selectable light function settings 15a the primary color is denoted with a capital letter illustrating the majority color, and a lower case letter, i.e., r=red, o=orange, y=yellow, b=blue, i=indigo and v=violet, to illustrate the minority color in the mixture. For example, Ro illustrates a color mixture in which red R is the primary color present in a majority that is mixed with orange o, in which orange o is the secondary color present in a minority amount. In the example depicted in FIG. 6, each color family includes two shades mixed with an adjacent color family on the color wheel. It is noted that this is only one example of the degree of the amount of color mixtures that can be in a family of a primary color, and is not intended to limit the present disclosure. In other embodiments, the amount of selectable light function settings 15a illustrating the range of shades/mixtures within a primary color may be equal to 1, 5, 10, 15, 20, 30, 40, 50 and 100, and any range of light function settings in which one of the aforementioned examples provides a lower limit to the range and one of the aforementioned examples provides an upper limit to the range, as well as any value within those ranges.

It is also noted that the circular geometry of the color wheel that is depicted in FIG. 6 provides only one example of a geometry that is suitable for a grid of light functions 48a including selectable light function settings 15a for color. In other embodiments, a square or other multi-sided geometry may be substituted for the color wheel. Additionally, the selectable light function settings 15a for color may be arranged in a bar scale type geometry.

Still referring to FIG. 6, the grid of light functions 48a, 48b, 48c may also include a second field 48b of a dimming scale (dimming scale 48b), and a third field 48c of a color temperature scale (color temperature scale 48c). In other embodiments, at least one of the color wheel 48a, the dimming scale 48b and the color temperature scale 48c may be omitted. In one embodiment, the dimming scale 48b includes icons illustrating a degree of dimming, i.e., a degree by which the light being projected by the luminaires. In some examples, dimming or light intensity may be measured using lux. In some embodiments, the dimming or light intensity scale 48b can provide for adjusting lighting between 100 lux to 1000 lux. For example, lighting for office work may be comfortably done at a value between 250 lux to 500 lux. For greater intensity applications, such as work areas that involve drawing or other detail work, the intensity of the lighting may be provided by luminaires that are illuminated to a range within 750 lux to 1,000 lux.

Referring to FIG. 6, in some embodiments the dimming scale 48b (also referred to as second grid of light functions 48b) provides selectable light function settings 15b correlated to dimming/intensity, i.e., a measurement of lux. The dimming scale 48b may have the geometry of a horizontally orientated bar gauge, in which the lowest intensity levels, i.e., highest degree of diming, is present on the left end of the bar gauge, and the highest intensity level is present on the right end of the bar gauge. It is noted that the bar gauge is only one example of the geometry of the grid of light functions 10b that can provide selectable light function settings 15b for dimming/intensity of light being projected by luminaires. Other geometries have also been contemplated, such as circles, may also provide the shape of the dimming scale 48b. Additionally, the dimming scale 48b can be a bar gauge having a different orientation than the lateral orientation depicted in FIG. 6. For example, the dimming scale 48b can be a vertically orientated scale/gauge.

Referring to FIG. 6, in some embodiments the color temperature scale 48c provides a grid light functions 48c having selectable light function settings 15c correlated to color temperature, i.e., a measurement having the units degrees Kelvin (° K). The color temperature scale 48c may have the geometry of a vertically orientated bar gauge, in which the lowest color temperature levels, i.e., lowest Kelvin values, are present at the bottom end of the bar gauge, and the highest color temperature levels are present on the top end of the bar gauge. In the embodiment that is depicted in FIG. 6, the icons for the selectable light function settings 48c include a textual description of the value in Kelvin of the light that the icon represents, and the icons increase in size from the smallest size icons representing the lowest Kelvin levels of light to be projected by the luminaires to the greatest size icons representing the highest Kelvin levels of light to be projected by the luminaires. It is not necessary that the selectable light function settings 48c specifically describe numerical Kelvin ranges, or having increasing or decreasing size icons. In some examples, the range of Kelvin selected for the color temperature can range from 2000K to 6500K.

In some embodiments, a user selects the color characteristics (from the grids 48a, 48b, and/or 48c) on the user interface 49 of the control device 200. The control device 200 includes an NFC transmitter 45. The NFC transmitter 45 of the control device 200 sends an external command signal (NFC signal 60) to the NFC receiver 51 of the NFC circuit 50 in the driver electronics 30 of the lamp 100.

Still referring to FIG. 6, in some embodiments, the user interface 49 includes a setting for selecting human centric lighting (HCL) 48d lighting characteristics. The element identified by reference number 48d is a button, field or icon on the user interface 49 that a user would activate to program electronic drivers to drive lighting characteristics of the light engine to provide human centric lighting (HCL). Activating the element identified by reference number 48d on the user interface 49 selects human centric lighting to be transmitted by NFC protocols when programming driver electronics using the mobile device. As noted above, programming the driver electronics using NFC protocols can involve contacting (which can include direct contact) the mobile device to the electronic driver, e.g., by tapping the mobile device and the electronic driver together.

In some examples, the control application that is running on the mobile computing device that provides the user interface 49 has been preprogrammed to have human centric lighting (HCL) 48d setting for light color, color correlated temperature (CCT) and diming lighting characteristics that resemble the lighting cycle for the human circadian rhythm that is depicted in FIG. 4. For example, for the preprogrammed human centric lighting (HCL) 48d setting, the color correlated temperature (CCT) for the light cycle for a 24 hour night/day period may correspond to the lighting characteristics in FIG. 5. In this example, a user withing to program driver electronics 25a, 25b to provide human centric lighting (HCL) would select the button or icon having reference number 48*d* on the user interface 49. The NFC transmitter 45 of the control device 200 sends an external command signal (NFC signal 60) including the lighting characteristics for human centric lighting (HCL) to the NFC receiver 51 of the NFC circuit 50 in the driver electronics 30 of the lamp 100. The driver electronics 30 of the lamp may further include a microcontroller for adjusting the lighting characteristics of the lamp over 24 hour period in accordance with the instructions provided from the control device 200.

In yet another embodiment, a user can make adjustments to the lighting characteristics of the human circadian rhythm through the control device. For example, the user interface 49 may include an icon, field or button identified by reference number 48*e* for adjusting/setting the lighting characteristics for human centric lighting (HCL). By selecting the set function identified by reference number 48*e*, the lighting characteristics for human centric lighting (HCL) may be adjusted using the grids for color 48*a*, dimming 48*b* and color correlated temperature 48*c*. The adjustments may be made to a base human circadian rhythm cycle, such as the example provided in FIGS. 4 and 5. Adjustments to a base human circadian rhythm cycle can be made to more appropriately light specific scenes. For example, the base human circadian rhythm cycle may be optimized for a bedroom. However, other areas may benefit from adjustment to the color correlated temperature (CCT). For example, office spaces/work spaces and spaces in which entertaining occurs are examples of scenes that may require adjustment of lighting from a lighting scheme that is optimized for a bedroom.

Following adjustments, the lighting characteristics can be saved through the user interface 49. For example, the modified lighting characteristics for human centric lighting may be saved in memory on the mobile device, and the modified lighting characteristics may be associated with the field, icon and/or button of the user interface 49. The modified lighting scheme for human centric lighting (HCL) can be programmed onto the electronic driver 25*a*, 25*b* using NFC protocols. In this manner, by activating the field, icon and/or button of the user interface 49 sets the mobile computing device to transfer the modified lighting characteristics for human centric lighting to the electronic drivers using near field communication (NFC) protocols. For example, the NFC transmitter 45 of the control device 200 sends an external command signal (NFC signal 60) including the lighting characteristics for human centric lighting (HCL) to the NFC receiver 51 of the NFC circuit 50 in the driver electronics 30 of the lamp 100.

Figure 13:
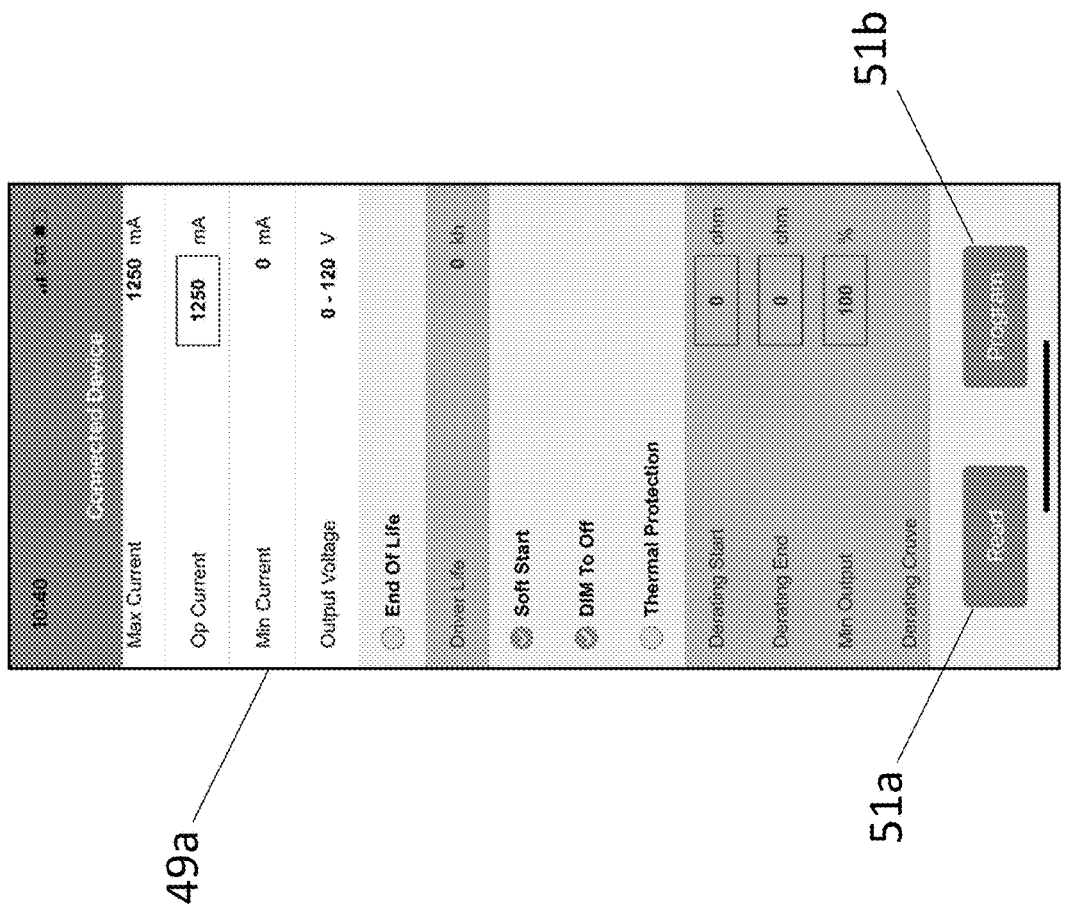
FIG. 13 is an illustration depicting a screen shot of a user interface of a mobile computing device using near field communication (NFC) protocols to program driver electronics, in accordance with one embodiment of the present disclosure.

It is noted that the user interface 49 illustrated in FIG. 6 is only one example of user interface that is suitable for use with the methods and systems of the present disclosure. The present disclosure is not intended to be limited to only this example. For example, FIG. 13 is an illustration depicting a screen shot of a user interface of a mobile computing device using near field communication (NFC) protocols to program driver electronics, in accordance with one embodiment of the present disclosure. The user interface 49*a* depicted in FIG. 13 may include fields to provide information on current being provided to the light engine of the lighting device, such as max current, operational (op) current, minimum (min) current, and output voltage. Other information that can be viewed on the user interface 49*a* can include luminaire end of life, driver life, as well as dimmer controls and thermal protection information. All this information is available from the driver electronics using near field communication protocols to transfer the information to and from the drive electronics to the mobile device that is running the user interface 49*a*.

Figure 7:
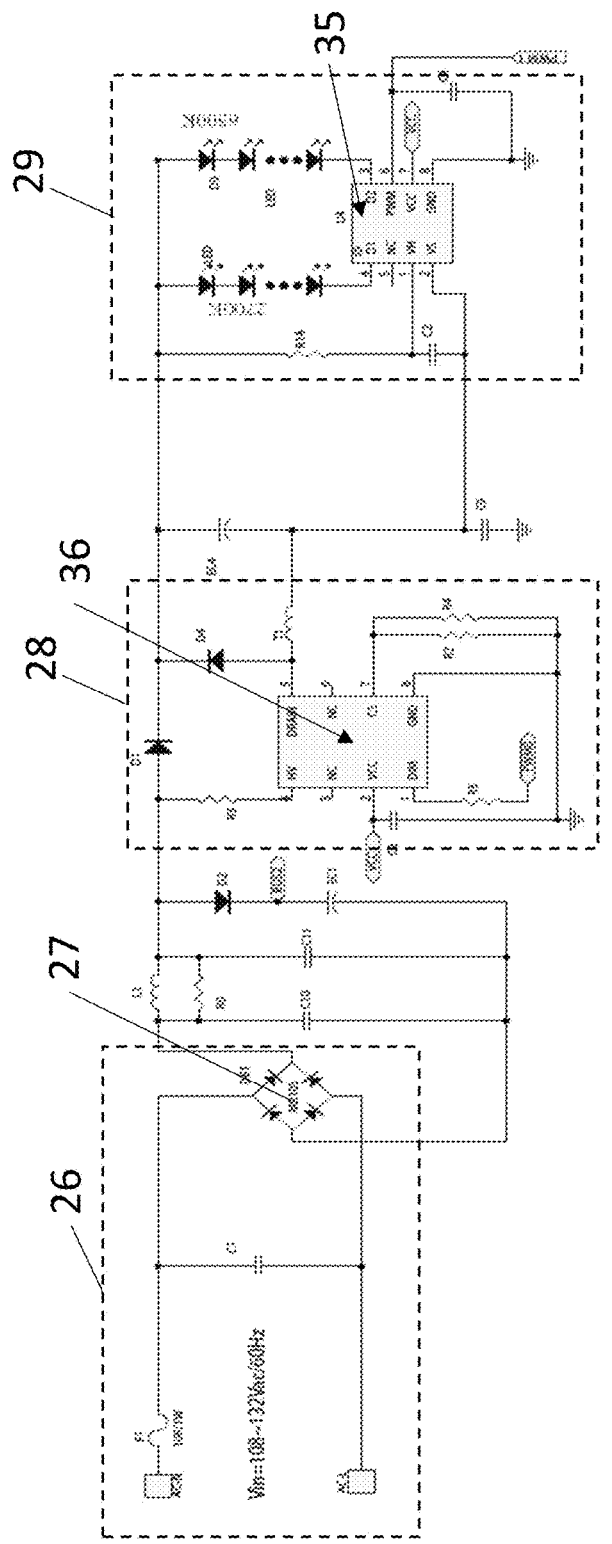
FIG. 7 is a circuit diagram of the driver electronics of a lamp including an integrated near field communication (NFC) receiver, in accordance with one embodiment of the present disclosure.
Figure 8:
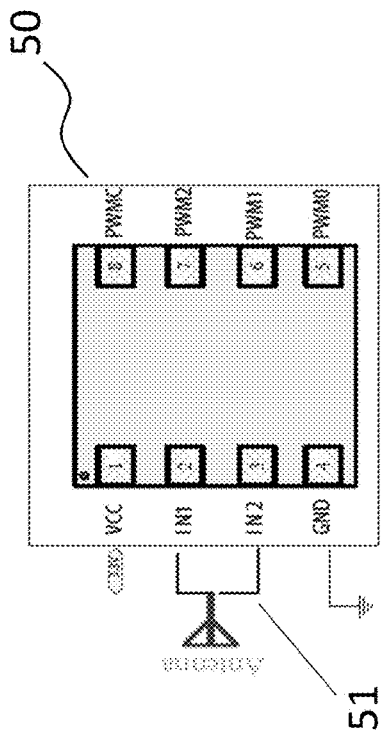
FIG. 8 is a circuit diagram of an NFC module of the driver electronics circuit depicted in FIG. 7, in accordance with one embodiment of the present disclosure.
Figure 9:
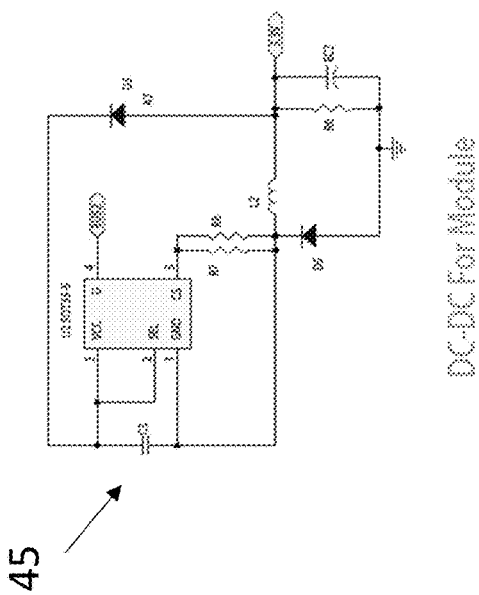
FIG. 9 is an auxiliary power module for the NFC module depicted in FIG. 8, in accordance with one embodiment of the present disclosure.

The circuit diagrams for the NFC circuit 50 are depicted in FIGS. 7-9. FIG. 7 is a circuit diagram of the driver electronics of a lamp including an integrated near field communication (NFC) receiver. FIG. 8 is a circuit diagram of an NFC module of the driver electronics circuit depicted in FIG. 7. FIG. 9 is an auxiliary power module for the NFC module depicted in FIG. 8. The NFC circuit 50 includes memory having instructions stored thereon to interpret the external command signal (NFC signal 60) received from the control device 200 to include the selected characteristics for light that the user has selected from the interface 49 to be emitted by the light engine 20. The instructions on the memory provide an output from the NFC module of the NFC circuit 50 that is sent to the mixing integrated circuit (IC) 35. More particularly, in one embodiment, the instructions stored in the memory of the NFC circuit 50 provide for an NFC control signal including at least one of PWM signals to the mixing integrated circuit (IC) 35. The mixing integrated circuit (IC) 35 receiving the control signal sets a separate current to each of the at least two lighting schemes (e.g., light strings 56*a*, 56*b*) to control light characteristics for light being emitted by the light engine 20. The control signals sent by the NFC module to the mixing integrated circuit (IC) can be a pulse width modulation signal. Pulse Width Modulation (PWM) is a digital technology that uses the amount of power delivered to a device that can be changed. It generates analogue signals by using a digital source. A PWM signal is basically a square wave which is switched between on and off state.

The driver electronics 26 including the NFC circuit 50 (including the NFC receiver 51) can be contained within the housing 10.

FIG. 7 is a circuit diagram of the driver electronics 30 contained within the driver electronics box 25*a*, 25*b* including an integrated near field communication (NFC) receiver 51. The driver electronics 30 include an AC input circuit 26, which includes a rectifying bridge 27. In some embodiments, the Vin=108~132 Vac/60 Hz. The AC input circuit 26 feed AC current into a power supply circuit 28. The power supply circuit 28 includes an analog power supply integrated circuit 36 that delivers constant current to the mixing integrated circuit 35. The mixing integrated circuit 35 is a component of the LED power supply circuit 29. The light engine 20 including the LEDs 55*a*, 55*b* (in some embodiments LED strings 56*a*, 56*b*) receives current from the power supply circuit 29 for powering the LEDs 55*a*, 55*b*.

The mixing integrated circuit 35 distributes portions of the current to each of the lighting arrangements, e.g., light emitting strings 56*a*, 56*b*. The mixing integrated circuit 35 is an analog integrated circuit (IC). The analog IC that provides the mixing integrated circuit 35 may include memory including instructions for reading the control signal sent by the NFC circuit 50. The instructions may include how the current received by the mixing integrated circuit 35 from the power supply circuit 30 is distributed to the different lighting arrangements, e.g., different strings of light emitting diodes (LEDs), for light mixing in setting the light characteristics for the collective light being emitted by the light engine 22.

FIG. 8 is a circuit diagram of an NFC module providing the NFC circuit 50 for the driver electronics circuits 25 depicted in FIG. 7. The NFC module may be provided by an ISO 15693 and NFC Forum Type 5 tag, with one or two pulse width modulation (PWM) outputs and 2 Kbits of electrically erasable programmable memory (EEPROM). In one embodiment, the NFC module can provide two interfaces. The first delivers up to 2× independent PWM output signals. The PWM output signals are illustrated by "PWM1" and "PWM2" in FIG. 8. These output signals can be in electrical communication with the mixing integrated circuit 35 of the LED power supply circuit 29. For example, the output identified by "PWM1" in FIG. 8 may be connected to the input to the mixing integrated circuit 35 identified by "PWM1" in FIG. 7. The second interface is an RF link activated by the received carrier electromagnetic wave. The RF link is labeled in FIG. 8 as antenna. This can provide one embodiment of the NFC antenna 51 of the NFC circuit.

In some embodiments, the NFC module includes 256 bytes (64 blocks) of memory for User data. The memory is accessible through the RF interface, following ISO/IEC 15693 or NFC Forum Type 5 Tag. The PWM outputs can be configured at boot time, and can be updated live through RF link. In some examples, NFC-writer-reader equipment write parameters to the NFC module, e.g., memory of the NFC module, by the antenna.

In one example, the outputs of the NFC module in the NFC circuit 50 can include two independent pulse width modulation (PWM) outputs. The signal for the PWM outputs may range from 488 Hz to 31250 Hz. The signal may have a 62.5 ns pulse width resolution from a 15-bit resolution at 488 Hz to 9-bit resolution at 31.25 kHz.

In one example, the contactless interface, i.e., wireless interface, for the NFC module 50 is provided by an RF antenna that provides for receipt of an NFC signal. This interface of the NFC module can be based on ISO/IEC 15693 and NFC Forum Type 5 Tag.

In one example, the memory of the NFC module may include 2-kbit of EEPROM. The NFC module may have a package configuration of one of SO8N and TSSOP8 or ECOPACK2 (RoHS compliant).

In some examples, the PWM module output labeled "PWM0" in FIG. 8 may be in electrical communication with the signal control labeled "PWM0" in FIG. 7 (also labeled "DIM") of the dimmable integrated circuit (IC)(analog power supply integrated circuit 36) to adjust output parameters of the light engine 20 of the lamp 100 for dimming. In some embodiments, this can provide that the NFC module of the NFC circuit 50 provide an output for PWM dimmer performance for the lamp 100. In some examples, 1 PWM port of the NFC module may be used to dim, e.g., modulate, the color correlated temperature (CCT) or intensity of the light emitted by the light engine 20; and five ports may be employed to dim, e.g., modulate, the color (i.e., Red (R), Green (G), Blue (B), White (W) (RGBW)), of the light emitted by the light engine.

In some embodiments, the near field communication (NFC) circuit has a near field communication (NFC) receiver 51 (ANTENNA) and memory for storing instructions for sending pulse width modulation (PWM) signals from the NFC circuit 50 to the mixing integrated circuit 35. The NFC receiver 51 (ANTENNA) can receive an external command signal that the instructions stored in the memory of the NFC circuit 50 employ to provide for an NFC control signal including at least one of the PWM signals to the mixing integrated circuit (IC) 35. The mixing integrated circuit (IC) 35 receiving the control signal sets a separate current to each of the at least two lighting schemes 56a, 56b to control light characteristics for light being emitted by the light engine 20. In some embodiments, controlling of the current to the at least two lighting schemes includes receiving at the mixing integrated circuit 35 a full current value from the power integrated circuit (IC) and distributing a first portion of the current to a first lighting scheme, e.g., a first LED string 56a, of the light engine 20, and distributing a second portion of the current to at least a second lighting scheme 56b of the light engine 20. In some embodiments, by employing multiple lighting schemes having different light characteristics and adjusting the current through the different lighting schemes, the light emitted by the lighting schemes can be mixed so that the total light emitted by the light engine adjusted in a functionally continuous manner.

FIG. 7 is an auxiliary power module for the NFC module depicted in FIG. 8. The auxiliary power module can provide a DC-DC power circuit for powering the NFC circuit 50. In one example, the DC-DC power circuit depicted in FIG. 9 is connected by the connector labeled "BUS2" to the connector labeled "BUS2" in the driver electronics circuit depicted in FIG. 7. In one example, the NFC module for the NFC circuit 50 depicted in FIG. 8 is connected at VCC identified as 3.3V to the VCC connector of the analog power supply integrated circuit 36 in the driver electronics circuit depicted in FIG. 5.

As noted, the driver electronics box 25a, 25b may have two different configurations. In the embodiment that is depicted in FIG. 1, the driver electronics box 25a is vertically orientated to provide that the driver electronics is positioned in a first level 14 of the second housing and a junction box 17 is present on a second level 16 of the second housing 15 to provide that a main power connection from the power source to the junction box 17 and a driver to light source power connection are vertically offset from one another. In the embodiment depicted in FIG. 2, the driver electronics box 25b includes two laterally disposed compartments for electrical connections on opposing sides of a centrally positioned compartment including the driver electronics for providing power to the light engine that is present in the physically separate downlight geometry light engine housing 20. The laterally disposed housing may have a width perpendicular to the direction separating the two laterally disposed compartments of 5 inches or less. This provides that the driver electronics housing can be installed into the ceiling through an opening for a light engine housing having a diameter of 5 inches or less, e.g., an opening for a 4" light engine housing, or an opening for a 3" light engine housing.

Figure 10:
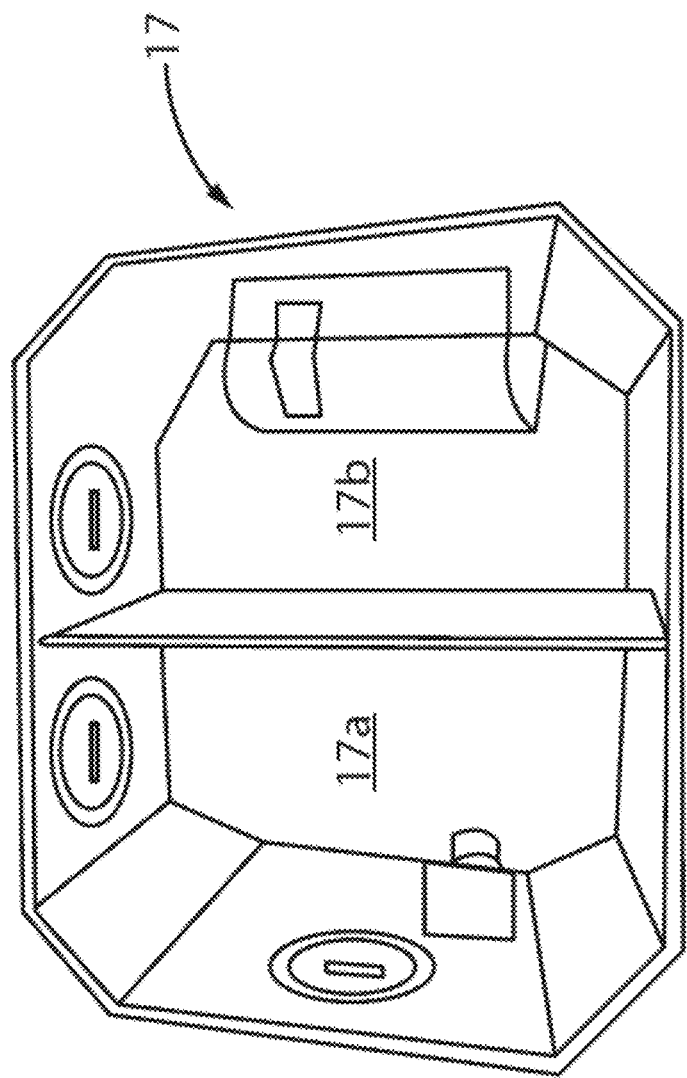
FIG. 10 is a perspective view illustrating one embodiment of the internal surfaces of a junction box for the vertically orientated driver electronics box depicted in FIG. 1.

Referring first to the vertically orientated driver electronics box 25a depicted in FIG. 1, the vertically orientated driver electronics box 25a of the downlight may include the driver electronics portion 13 and a junction box 17. FIG. 10 illustrates one embodiment of the internal surfaces of a junction box 17 includes two compartments 17a, 17b. The sidewalls of the junction box 17 includes a plurality of knock-out openings. A "knock out" or "KO" is a partially stamped opening in electrical enclosures that allows quick entry of a wire, cable or pipe via connector or fitting to the interior. The knock out, e.g., openings, each lead to one of the compartments 17a, 17b of the junction box. In some embodiments, at least one of the compartments 17a, 17b of the junction box is for a main power connection. In some embodiments, at least one of the compartments 17a, 17b are for the connection to a dimming circuit. In some further embodiments, the compartments 17a, 17b for the junction box may also include connections for an auxiliary power module, such as an emergency backup battery. The compartments 17a, 17b are sufficiently large to allow for light assemblies to be daisy chained together. In one embodiment, the compartments 17a, 17b may each of a volume of 10 cubic inches or greater. This is only one example, and other examples are equally applicable. For example, the compartments 17a, 17b may have a volume ranging from 9 cubic inches to 15 cubic inches. In one example, the compartments 17a, 17b have a volume of 12 cubic inches. The junction box 17, as well as, the entirety of the second housing may be composed of a plastic, such as polycarbonate. In some embodiments, the second housing 15 may be composed of a metal.

The vertically orientated driver electronics box 25a is vertically orientated to provide that the driver electronics are positioned in a first level 14 of the vertically orientated driver electronics box 25a, and a junction box is present on a second level 16 of the vertically orientated driver electronics box 25a. The junction box is hereafter referred with reference number 17, and provides the connection point for a main power connection from the power source. The driver electronics portion of the box is referred to with reference number 13, and provides the connection point for the driver to light source power connection. Referring to FIGS. 1-10, the second housing is vertically orientated to provide that the driver electronics 13 are positioned in a first level 14 of the vertically orientated driver electronics box 25a, and a junction box 17 is present on a second level 16 of vertically orientated driver electronics box 25a to provide that a main power connection from the power source to the junction box and a driver to light source power connection are vertically offset from one another. By "vertically offset" it is meant that the connection point for the main power at the junction box portion of the second housing vertically orientated driver electronics box 25a is on a different plane than the connection point at the electronics driver 17 portion of the vertically orientated driver electronics box 25a. The electrical connections for the main power to the junction box portion of the vertically orientated driver electronics box 25a may be through openings (also referred to as punch outs) that are formed through sidewalls of the vertically orientated driver electronics box 25a.

In some embodiments, the main power wire enters the second level 16 of the second housing 15, which is the junction box 17 portion of the vertically orientated driver electronics box 25a. The main power wire may provide to the downlight a universal input voltage, e.g., a voltage ranging from 120V to 277V. In some further examples, the main power wire may provide an input voltage of 347V. An input voltage of 120-277V can be suitable for commercial applications. In some embodiments, the input voltage can be 120V, which can be suitable for both residential and commercial applications. In addition to the main power wire, the junction box 17 may also include a connection for dimming controls, i.e., dimming wire connection. In some embodiments, the downlight described herein may have a diming wire that provides for 0-10V and phase dimmable applications. In some embodiments, the junction box 17 may also include connections for auxiliary power, such as a battery backup, e.g., emergency battery backup.

Referring to FIGS. 1 and 10, in some embodiments, the vertically orientated driver electronics box 25a includes the NFC receiver 51 of the NFC circuit 50 that is integrated into the driver electronics 30. The NFC receiver 51 receiving a command by near field communication (NFC) signal for selecting a light characteristic for the light projected by the light emitting diode (LED) light source 22 of the downlight geometry light engine housing 20. As noted, the NFC receiver 51 and NFC circuit 50 may be present in the level of the vertically orientated driver electronics box 25 housing the driver electronics 30, i.e., the driver electronics portion 13.

In some embodiments, the vertically orientated driver electronics box 25a, is separable from the first housing, e.g., downlight geometry light engine housing 20, so that the vertically orientated driver electronics box 25a can be easily retrofitted in place or mounted to a new tray in new construction. To provide that the vertically orientated driver electronics box 25a is separable from the downlight geometry light engine housing 20, a reversible driver to light source connector 21 is provided for electrically connecting the downlight geometry light engine housing 20 and the vertically orientated driver electronics box 25a including the driver electronics. In some embodiments, the reversible driver to light source connector 21 is a connector having a first terminal that is engaged to the light emitting diode (LED) light source 22 in the downlight geometry light engine housing 20 and a second terminal that is engaged to the driver electronics in the vertically orientated driver electronics box 25a. In some embodiments, the first terminal is a male terminal, and the second terminal is a female. In some embodiments, the first terminal is a female terminal, and the second terminal 20b is a male terminal. In one embodiment, the first and second terminals screw together to provide the electrical connection. The first and second terminals may then be screwed apart in an opposite direction from which they were screwed together. Generally, the first and second terminals include a housing containing terminal contacts. In some embodiments the housings for the first and second terminals are threaded to provide that they can be screwed together. In other embodiments, the first and second terminals are provided by terminal blocks, such as terminal blocks with screw terminals, terminal blocks with barrier terminals, terminal blocks with push-fit terminals, terminal blocks with pluggable terminals and combinations thereof.

Figure 11:
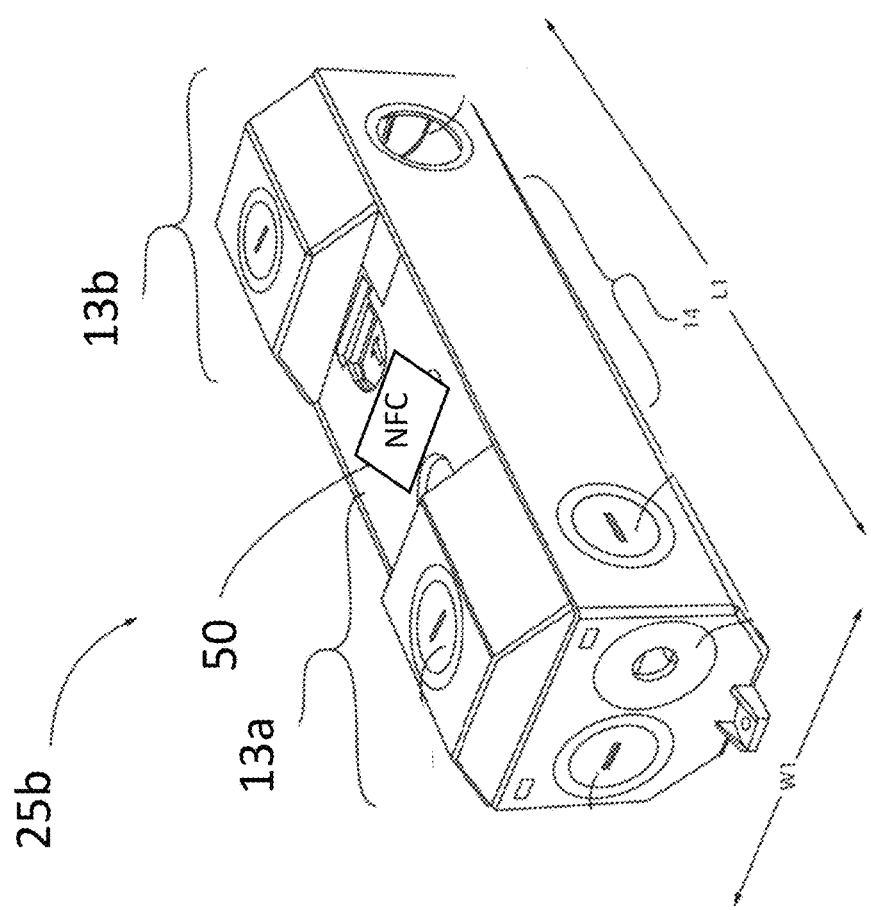
FIG. 11 is a perspective view illustrating one embodiment of a laterally orientated driver electronics housing including two laterally disposed compartments for electrical connections on opposing sides of a centrally positioned compartment including driver electronics, in accordance with the present disclosure.
Figure 12:
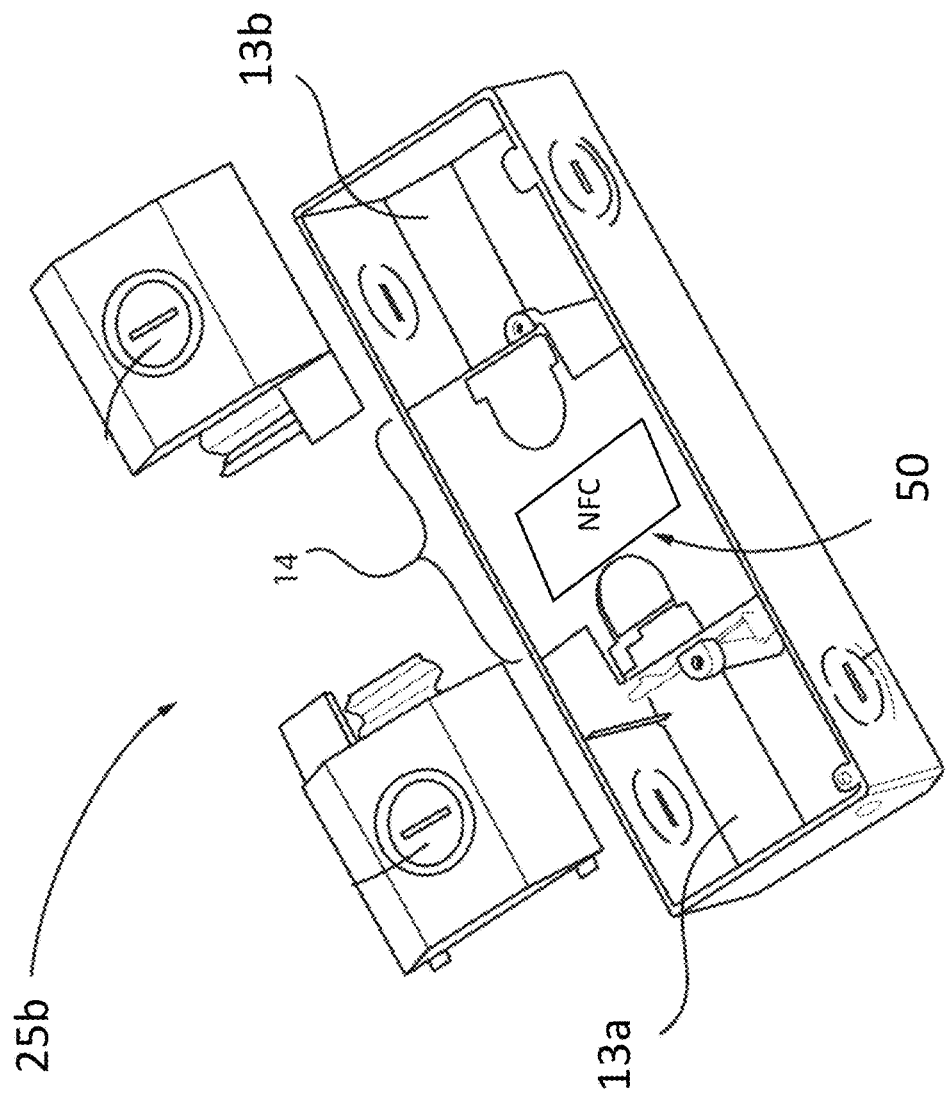
FIG. 12 is an exploded perspective view of the driver electronics housing depicted in FIG. 9 in which the covers for the two laterally disposed compartments of the driver electronics housing is removed, in accordance with one embodiment of the present disclosure.

Referring to the laterally orientated driver electronics box 25b depicted in FIGS. 2, 11 and 12, the laterally orientated driver electronics box 25b of the downlight may include two laterally disposed compartments 13a, 13b for electrical connections on opposing sides of a centrally positioned compartment 14 including driver electronics. The centrally positioned compartment 14 of the laterally orientated driver electronics box 25b includes the NFC receiver of the NFC circuit 50 that is integrated into the driver electronics. In some embodiments, a first compartment 13a of the two laterally disposed compartments includes a main power connector for connection to a main power source. In some embodiments, a second compartment 13b of the two laterally disposed compartments includes a dimming control electrical connection for a dimming circuit for dimming the light emitted by the light source. In some embodiments, the second compartment 13b of the two laterally disposed compartments includes an auxiliary power connection for electrical connection with a battery backup.

The driver electronics housing 25b is laterally orientated to provide that the driver electronics are within a driver compartment 14 that is positioned between a first compartment 13a including a main power connection on a first side of the driver compartment 14, and a second compartment 13b including at least one of a connection for a dimming control electrical connection or a connection for an auxiliary power connection. The length L1 of the driver electronics housing 25b extends from an exterior end of the first compartment 13a across the driver compartment 14 to an opposing exterior end of the second compartment 13b. The width W1 of the driver electronics housing 25b is perpendicular to the length L1 of the driver electronics housing 25b. The width W1 of the driver electronics housing 25b is less than 5 inches. The width W1 of the driver electronics housing 25b is less than 5 inches to fit within small diameter openings for small diameter light engine housings. For example, the width W1 of the driver electronics housing 25b may be selected to provide that the driver electronics housing 25b can be passed through the opening in a ceiling for a 4" light engine housing, e.g., a reflector and light engine combination. In another example, the width W1 of the driver electronics housing 25b may be selected to provide that the driver electronics housing 15 can be passed through the opening in a ceiling for a 3" light engine housing, e.g., a reflector and light engine combination.

The length L1 is greater than the width W1 of the driver electronics housing 25b. For example, the length L1 of the driver electronics housing is at least 1.5 times (1.5×) greater than the width W1 of the driver electronics housing 25b. In another example, the length L1 of the driver electronics housing is at least two times (2.0×) greater than the width W1 of the driver electronics housing 25b. In yet another example, the length L1 of the driver electronics housing 15 is at least 2.5 times (2.5×) greater than the width W1 of the driver electronics housing 25b. In a further example, the length L1 of the driver electronics housing is at least 3.0 times (3.0×) greater than the width W1 of the driver electronics housing 25b. It is noted that any range of values is equally applicable to the relationship of the length L1 and width W1 of the driver electronics housing 25b. For example, the length L1 of the driver electronics housing 25b may range from being 1.5 times (1.5×) to 3 times (3×) greater than the width W1 of the driver electronics housing 25b. In another example, the length L1 of the driver electronics housing 25b may range from 1.5 times (1.5×) to 2.5 times (2.5×) greater than the width W1 of the driver electronics housing 15. In one example, the width W1 of the driver electronics housing 25b is 5 inches or less. In one example, the width W1 of the driver electronics housing 25b may be equal to approximately 2.75" and the length L1 of the driver electronics housing 25b may be equal to approximately 8". The width W1 of less than 3" allows for the driver electronics housing 25b to be passed through an opening of 4 inches or less, e.g., 3", which can allow for a installing the driver electronics housing 25b into a ceiling from a room side of a ceiling through a small diameter opening.

In some embodiments, the driver electronics housing 25b is laterally orientated (also referred to as laterally disposed) to provide that the first compartment 13a including the main power connection, the driver electronics compartment 14 (including the NFC circuit 50), and the second compartment 13b including at least one of the connection for a dimming control electrical connection or a connection for an auxiliary power connection are present in line substantially on a same level along the direction parallel to the length L1 of the driver electronics housing 25b. As noted above, the length L1 of the driver electronics housing 25b is greater than the width W1 of the driver electronics housing 25b.

The electrical connections for the main power to the first compartment 13a to the driver electronics, and the electrical connections for at least one of the connection for a dimming control electrical connection or a connection for an auxiliary power connection to the second compartment 13b, may be through openings (also referred to as punch outs/knock outs) that are formed through sidewalls of the driver electronics housing 25b. The main power connection within the first compartment 13a provides the connection point for a main power from the power source. This connection may provide the connection point for the driver to light source power connection.

The sidewalls of the driver electronics housing 25b includes a plurality of knock-out openings. A "knock out" or "KO" is a partially stamped opening in electrical enclosures that allows quick entry of a wire, cable or pipe via connector or fitting to the interior. The knockout, e.g., openings, each lead to one of the compartments 13a, 13b of the junction box.

The driver electronics housing 25b is a component of a light structure. The driver electronics housing 25b can be connected to a downlight geometry light engine housing 20 through a reversible driver to light source connector 21 for electrically connecting the downlight geometry light engine housing 20 containing the light emitting diode (LED) light source and the driver electronics housing 25b including the driver electronics. In some embodiments, a first end of the reversible driver to light source connector 21 is engaged to the driver electronics through a first wired electrical pathway. In some embodiments, the first terminal that is in electrical communication to driver electronics by wired connection, e.g., the first wired electrical pathway, is extending through a second compartment 13b of the two laterally disposed compartments for electrical connections.

FIG. 12 depict one embodiment of a driver electronics housing 25b in which the covers for the two laterally disposed compartments 13a, 13b of the driver electronics housing 25b are removed. In one embodiment, the first and second compartments 13a, 13b may each of a volume of 10 cubic inches or greater. This is only one example, and other examples are equally applicable. For example, the compartments 13a, 13b may have a volume ranging from 9 cubic inches to 15 cubic inches. In one example, the compartments 13a, 13b have a volume of 12 cubic inches. The driver electronics housing 25b may be composed of a plastic, such as polycarbonate. In some embodiments, the driver electronics housing 25b may be composed of a metal. The driver electronics housing 25b may have a multi-sided cylindrical geometry. For example, the driver electronics housing 25b may have an octagonal geometry, e.g., having eight sides.

It is noted that the geometry of the driver electronics housings 25a, 25b depicted in FIGS. 1, 2, 4 and 10-12 are provided for illustrative purposes and are not exhaustive for the types of geometries that are to be integrated with NFC controls, as described herein.

Figure 14:
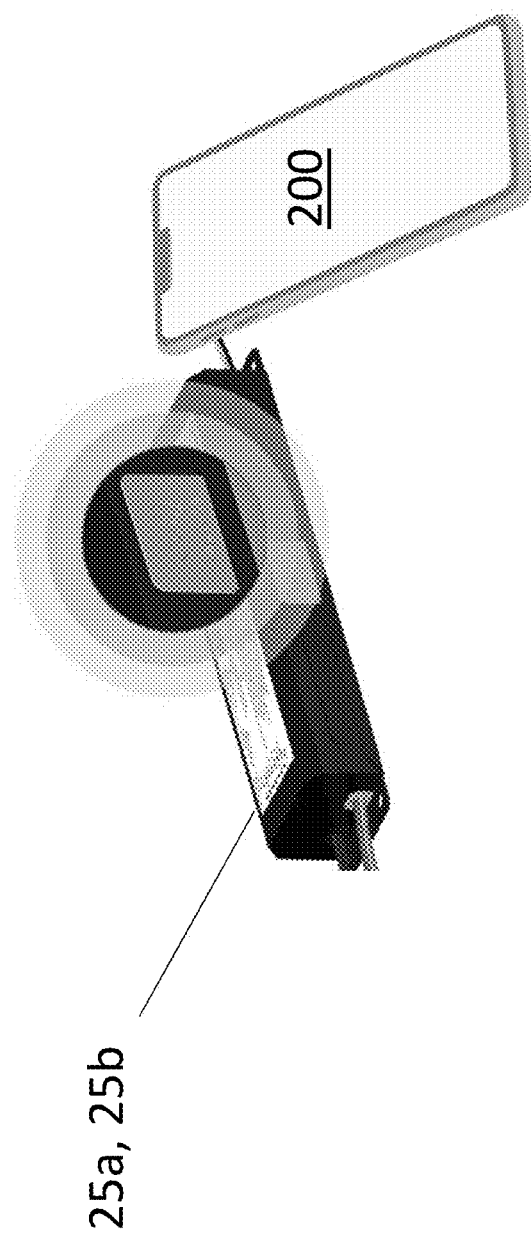
FIG. 14 is an illustration of a mobile communication device being "tapped" to an electronic driver for a light engine of a lighting device.

The present disclosure provides methods and structures for adjusting performance characteristics and device settings for lighting devices including light emitting diode (LED) light engines 22 using near field communication (NFC) communication protocols to communicate with the driver electronics 25a, 25b for powering the LED light engines 22. Some embodiments of the present disclosure include using the NFC communication protocols to transmit lighting settings to the light engine 22 of the lighting devices to emit lighting having lighting characteristics that provide human centric lighting (HCL). The NFC communication protocols allow for those lighting settings to be transmitted to a driver from an application (software) of a mobile computing device, such as a smart phone, by simply bringing the device 200 into close contact with the driver 25a, 25b, as depicted in FIG. 14. For example, the mobile computing device 200 running the application for setting the lighting characteristics may transmit those configured lighting characteristics to the driver 25a, 25b by near field communication (NFC) by tapping, e.g., making a momentary physical contact (e.g., direct contact), the mobile computing device 200 to the driver 25a, 25b. In some examples, when the driver has received the lighting characteristic settings from the mobile device 200, a confirmation signal may be sent back to the mobile computing device 200 by NFC signal, and in response to the confirmation signal a haptic feedback event may be performed by the mobile device 200.

The term "haptic" denotes communications that create the sense of touch by applying forces, vibrations, or motions to the user. For example, the mobile device 200 may vibrate or shake. The haptic feedback component of the mobile device 200 in one embodiment includes an actuator, such as, e.g., an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA"), a high bandwidth actuator, an electroactive polymer ("EAP") actuator, an electrostatic friction display, or an ultrasonic vibration generator. In addition to an actuator, the haptic feedback component of the mobile device 200 may be a non-mechanical or non-vibratory device such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc. Multiple haptic output devices with multiple haptic effects can generate a haptic effect. The generated haptic effects can include a wide range of effects and technologies, including vibrations, deformation, squeezing, poking, stretching, surface friction, heat, etc.

In some embodiments, the haptic feedback indicates to the user that the driver 25*a*, 25*b* has been programmed by the NFC signal for lighting characteristics. This provides the user does not have to view the screen of the device or perform any confirmation operations. Further, by the haptic feedback, the user does not have to even view the screen of the mobile device that is running the application for setting lighting characteristics to determine that the driver has been successfully programmed. In this manner, the methods and structure provided herein allow for a quick mechanism for a user to program multiple drivers quickly. It is noted that the haptic feedback is optional. In other embodiments, the screen of the mobile device may provide a text message or a light that indicates that the driver 25*a*, 25*b* has been programmed by the NFC signal for lighting characteristics.

It is noted that the mobile computing device 200 is not limited to only programming the electronic drivers 25*a*, 25*b* using near field communication (NFC). In some embodiments, the mobile computing device 200 may employ near field communication (NFC) to read data from the electronic drivers 25*a*, 25*b*, as well as using the near field communication (NFC) to program the electronic drivers 25*a*, 25*b*. For example, as depicted in FIG. 12, the user interface 49*a* may include regions/buttons/icons designated by reference numbers 51*a*, 51*b* for selecting to "read" or "program" the electronic drivers 25*a*, 25*b* using near field communication.

In some embodiments, using the NFC protocol, the user can read existing light settings off of a driver 25*a*, 25*b* that is in service. This can be helpful, when a user is servicing drivers or replacing drivers 25*a*, 25*b*. For example, using the read function, the installer can record the lighting characteristics by near field communication (NFC) by tapping, e.g., making a momentary physical contact, the mobile computing device 200 to the driver 25*a*, 25*b*. In some examples, when the mobile computing device 200 has received the lighting characteristic settings from the driver, a haptic feedback event may be performed by the mobile device 200. For example, the mobile device 200 may vibrate or shake. This indicates to the user that the mobile computing device has recorded the lighting characteristic settings from the driver 25*a*, 25*b* using NFC signal. In other embodiments, the read function may be confirmed by a text message being displayed on the user interface 49, 49*a* of the mobile computing device 200. Now that the mobile device 200 has recorded the lighting characteristics from the driver 25*a*, 25*b* in service, replacement drivers or additional drivers (and lighting products) having the same lighting characteristic settings can be programmed using NFC protocols. This can be achieved using the program 51*b* setting that can be activated on the user interface 49*a*. This allows for an installer, to retrieve lighting characteristics from in service drivers, and then program replacement drivers using NFC protocols, which provides a quick mechanism for a user to program multiple drivers quickly to replace or add additionally drivers and lighting products to an existing installation so that all of the installed lighting products emit light having the same lighting characteristics. Haptic feedback may be used to provide confirmation to the user that the new lighting devices having been programmed.

It is noted that the methods and systems of the present disclosure are not limited to the user interface 49*a* depicted in FIG. 13 for selecting a read function or programming function. In some embodiments, selecting a read function or programming function may be achieved using motions applied top the mobile computing device 200 that are specifically configured to select a read function or a programming function. These motions can be sensed by the mobile computing device using a motion sensor, such as a gyroscope, accelerometer, gravitational sensor and combinations thereof, that is incorporated within the mobile computing device, in which the motions of the mobile computing device are used to select whether the NFC controls are going to be used to read or program electronic drivers 25*a*, 25*b*.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. Having described preferred embodiments of DRIVER ELECTRONICS FOR LIGHT EMITTING DIODE LIGHT ENGINE WITH INTEGRATED NEAR FIELD COMMUNICATION BASED CONTROLS INCLUDING HUMAN CENTRIC LIGHTING SETTINGS, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for configuring light structures comprising:
   a light engine including at least one lighting scheme comprised of light emitting diodes (LEDs); and
   a plurality of driver electronics for powering the light engine, each of the drivers in the plurality of driver electronics including at least a mixing integrated circuit (IC) for controlling current to the at one lighting schemes, and a near field communication (NFC) circuit having a near field communication (NFC) receiver and memory for storing instructions for sending signals from the NFC circuit to the mixing integrated circuit, the NFC receiver receiving an external command signal that the instructions stored in the memory of the NFC circuit employ to provide for an NFC control signal to the mixing integrated circuit (IC) to adjust lighting characteristics of the light engine, the memory of the NFC circuit including instructions for a read function and a record function, the read function for sending lighting characteristic settings from the memory of the driver circuit to a mobile device for setting lighting characteristics in the light structures of the system, and the record function for receiving lighting characteristics from the mobile device for setting lighting characteristics to the driver circuit of the light structures of the system, wherein the mobile device transfers lighting characteristic settings for controlling illumination from a first driver in the plurality of driver electronics of the system for configuring light structures to at least a second driver in the plurality of driver electronics of the system for configuring the light structures using the read and record functions of the memory.

2. The system of claim 1, wherein the lighting characteristics are adjusted to provide human centric lighting (HCL).

3. The system of claim 2, wherein the human centric lighting (HCL) includes color correlated temperature lighting settings that are in a cycle timed to match a human circadian rhythm.

4. The system of claim 2, wherein the lighting characteristics are adjusted to provide for adjustments to the color correlated temperature of the light being emitted by the light engine.

5. The system of claim 1, wherein the NFC receiver receives the external command signal from a control application being run on a mobile computing device.

6. The system of claim 5, wherein the mobile computing device is a smart phone.

7. The system of claim 1, wherein the light engine is configured for being housed within a downlight.

8. The system of claim 1, wherein the light engine is configured for being housed within a tube light.

9. The system of claim 1, wherein the light engine is configured for being housed within a flood light.

10. A method for setting lighting characteristics of lighting devices:
configuring a plurality of driver electronics for the lighting devices to include a light near field communication (NFC) transceiver of an NFC circuit including at least the light NFC transceiver and memory, wherein each driver in the plurality of the driver electronics control current to the light engine of the lighting devices, the memory of the NFC circuit including instructions for a read function and a record function, the read function for sending lighting characteristic settings from the memory of the driver electronics, and the record function for receiving lighting characteristics for setting lighting characteristics to the driver electronics;
running a control application on a mobile computing device including a computing device near field communication (NFC) transceiver, the control application for reading lighting characteristics using the read function of the driver electronics, and for sending lighting characteristics using the record function of the driver electronics to be emitted by the light engine of the lighting device;
reading from a first driver in the plurality of driver electronics light settings for the lighting characteristics being emitted by the lighting device using the computing NFC transceiver of the mobile computing device and the read function with the light NFC transceiver, wherein the light settings are stored on the mobile computing device;
transmitting the light settings from the mobile computing device to a second driver in the plurality of driver electronics from the mobile computing device using the computing NFC transceiver and the light NFC transceiver and the record function for receiving lighting characteristics for setting lighting characteristics to the driver electronics of the lighting devices; and
emitting light with the light engine having the light settings from the second driver.

11. The method of claim 10, wherein the lighting characteristics are adjusted to provide human centric lighting (HCL).

12. The method of claim 11, wherein the human centric lighting (HCL) includes color correlated temperature lighting settings that are in a cycle timed to match a human circadian rhythm.

13. The method of claim 10, wherein the light settings selected is a color correlated temperature of the light being emitted by the light engine.

14. The method of claim 10, wherein the mobile computing device is a smart phone.

15. The method of claim 10 further comprising a haptic feedback even being emitted by the mobile computing device in response to the signal to the mobile computing device that the light settings were received at the driver electronics.

16. The method of claim 10, wherein the light engine is configured for being housed within a lighting form factor selected from the group consisting of a downlight, a tube light, a strip light and a flood light.

17. The method of claim 10, wherein the transmitting the light settings from the mobile computing device to the driver electronics includes physically contacting the mobile computing device to the driver electronics.

* * * * *